US007557471B2

(12) United States Patent
Springer et al.

(10) Patent No.: US 7,557,471 B2
(45) Date of Patent: Jul. 7, 2009

(54) ACOUSTIC WAVE GENERATING APPARATUS AND METHOD

(75) Inventors: Jeffery T. Springer, La Honda, CA (US); James L. Kirschman, El Dorado Hills, CA (US); Robert M. O'Neill, Oxford, MS (US); Conrad P. Sandoval, Roseville, CA (US); Joseph B. Young, Paducah, KY (US)

(73) Assignee: Renaissance Sound, LLC, El Dorado Hills, CA (US)

( * ) Notice: Subject to any disclaimer, the term of this patent is extended or adjusted under 35 U.S.C. 154(b) by 0 days.

(21) Appl. No.: 12/216,131

(22) Filed: Jun. 30, 2008

(65) Prior Publication Data

US 2008/0290742 A1 Nov. 27, 2008

Related U.S. Application Data

(62) Division of application No. 11/294,097, filed on Dec. 5, 2005, now Pat. No. 7,402,922.

(60) Provisional application No. 60/633,924, filed on Dec. 6, 2004, provisional application No. 60/709,425, filed on Aug. 19, 2005.

(51) Int. Cl.
*H02K 41/00* (2006.01)
*H04R 5/02* (2006.01)

(52) U.S. Cl. .......................... 310/15; 310/36; 381/396; 335/209; 335/238

(58) Field of Classification Search .................. 310/12, 310/13, 15, 36, 81; 381/86, 333, 389, 395, 381/396; 601/147; 335/209, 229–235, 238, 335/285, 396
See application file for complete search history.

(56) References Cited

U.S. PATENT DOCUMENTS

| | | | | |
|---|---|---|---|---|
| 3,455,296 | A * | 7/1969 | McCaleb | 601/60 |
| 3,984,707 | A * | 10/1976 | McClintock | 310/15 |
| 4,259,653 | A * | 3/1981 | McGonigal | 335/230 |
| 4,542,311 | A * | 9/1985 | Newman et al. | 310/13 |
| 4,641,345 | A * | 2/1987 | Takahashi | 381/86 |
| 4,945,269 | A * | 7/1990 | Kamm | 310/15 |
| 5,896,076 | A * | 4/1999 | van Namen | 335/229 |
| 6,256,397 | B1 * | 7/2001 | Komatsu | 381/396 |
| 7,078,832 | B2 * | 7/2006 | Inagaki et al. | 310/12 |
| 2003/0142845 | A1 * | 7/2003 | Miyamoto et al. | 381/396 |

* cited by examiner

*Primary Examiner*—Tran N Nguyen
(74) *Attorney, Agent, or Firm*—J. A. McKinney

(57) ABSTRACT

A tactile wave generating apparatus for generating amplified low frequency waves for transmission as tactile waves into a structure or a person's body. There is a housing in which is positioned a drive section that in turn comprises a magnet section that moves upwardly and downwardly as an inertial mass, two coils on opposite sides of the magnet and two flux path return plates for the coils. Each coil comprises upper and lower longitudinally aligned generally linear coil portions which drive the magnet section upwardly and downwardly. The magnet section is supported by upper and lower interconnecting sections that resiliently resist the up and down motion of the magnet section and restrain the magnet section to move up and down within close tolerances.

7 Claims, 15 Drawing Sheets

ACOUSTIC WAVE GENERATING APPARATUS AND METHOD

This divisional application claims priority benefit to commonly owned patent application Ser. No. 11/294,097, filed Dec. 5, 2005 now U.S. Pat. No. 7,402,922, the entire disclosure of which is incorporated herein by reference. This application also claims priority benefit of U.S. Ser. No. 60/709,425 filed on Aug. 19, 2005, and U.S. Ser. No. 60/633,924, filed on Dec. 6, 2004, the entire disclosures of both being incorporated herein by reference.

BACKGROUND OF THE INVENTION

1. Field of the Invention

The present invention relates to a tactile wave generating apparatus and method, and more particularly to generating amplified low frequency waves which are transmitted as tactile sound into a structure and/or to a person's anatomy. Further the present invention relates to a system where the low frequency tactile waves may be transmitted to the person's body while the full audible waves are being transmitted to the person.

2. Discussion of the Prior Art

Electroacoustic transducers such as loudspeakers for use in music or movie soundtrack reproduction are well known. In traditional prior art sound reproduction systems, large, powerful speakers move large amounts of air to permit a listener to feel the low frequency of sound. Listeners enjoy live concerts, in part, because they want to feel the sound pressure upon their bodies.

In recent years, one of the more important trends in the audio industry is that of "tactile sound" which may be described as "vibro-acoustic" or "vibro-tactile" stimulation. With tactile sound the realism of the listening experience can be enhanced by transmitting tactile waves into the person's body. For example, this could be done by vibrating the listener's seating surface of a chair or other furniture or structures. These tactile waves are able to be sensed within the person's body to add another dimension to the person's listening experience.

The initial applications of these devices were as sub woofer replacements or sub woofer augmentation devices. The addition of higher frequency material began to demonstrate the potential of wider bandwidth devices and the associated additional dimensions that vibro-tactile stimulation brings to the overall experience. There are many parameters that need to be evaluated when designing and/or selecting a vibro-technical device for inclusion in music and/or an entertainment system. For example, bandwidths, efficiency and power handling need to be understood. These parameters can play a big role not only in the device selection but in the amplifier selection as well.

It is well understood in the loud speaker industry that sufficient bandwidths (i.e., flat frequency response with sufficient low frequency and high frequency limits) is critical for high fidelity reproduction. Vibro-tactile devices, like loud speakers, are devices that must be properly designed to refine the required bandwidth for accurate response.

It is with these and other considerations being kept in mind that the designs of the embodiments of the present invention were created.

SUMMARY OF THE INVENTION

In accordance with the present invention, a tactile wave generating apparatus generates amplified low frequency waves which are then transmitted as tactile waves into a structure or a person's body. The apparatus includes a housing in which is positioned a drive section that in turn has a magnet section suspended to move up and down as an inertial mass, and has two coils on opposing sides of the magnet and two flux path return plates for the coils. Each coil comprises upper and lower longitudinally aligned, generally linear coil portions aligned to-drive the magnet section up and down. The magnet section is supported by upper and lower interconnecting suspension sections that resiliently resist the up and down motion of the magnet section and restrain the magnet section to move up and down within close tolerances.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE PREFERRED EMBODIMENTS

Referring to FIGS. 1-8, a first embodiment of the present invention is arranged to transmit low frequency acoustic waves into a structure, such as a chair, so that these waves are transmitted into a person's body.

a) Main Components

Figure 1:
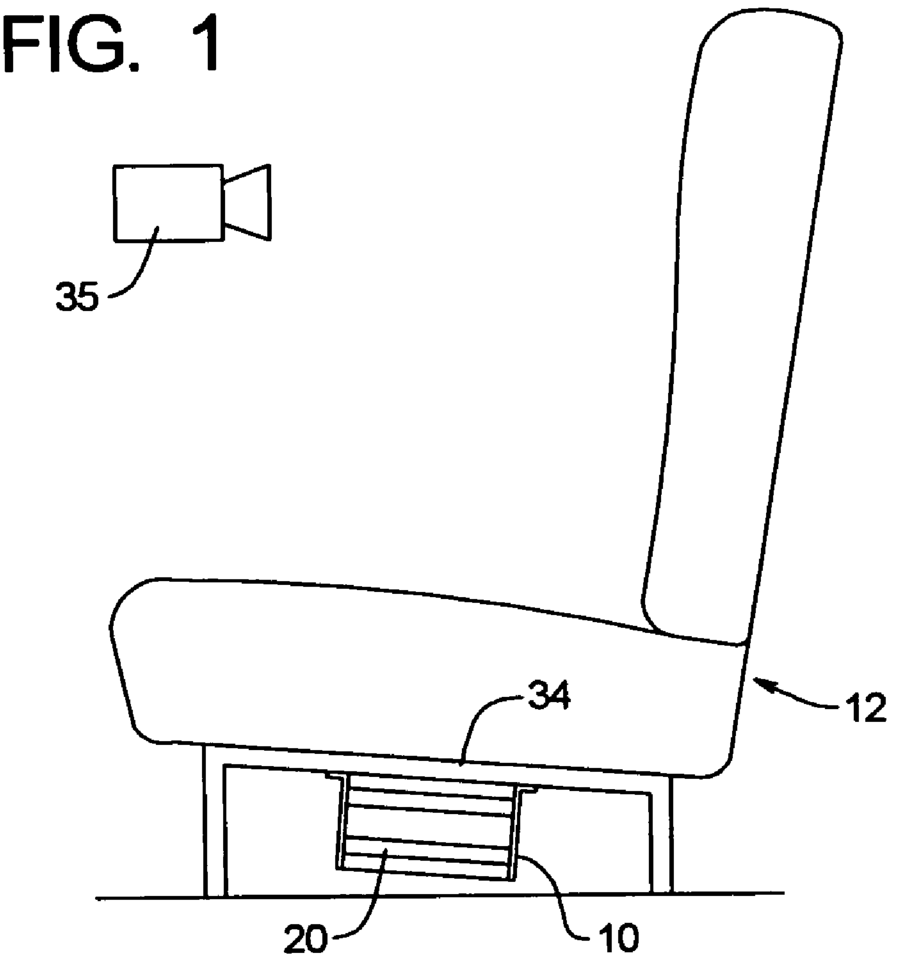
FIG. 1 is a side elevational view showing the apparatus of an embodiment of the invention being mounted in its operating position attached to a platform of a seat of a chair.

It is believed that a better understanding of this first embodiment will be obtained by first describing the main components of the wave generating apparatus 10 of the first embodiment, and then providing a rather brief description of how this apparatus 10 functions in its operating position where it is mounted to a structure such as a chair 12, as shown in FIG. 1. Then this will be followed by a more detailed description of this first embodiment.

Figure 2:
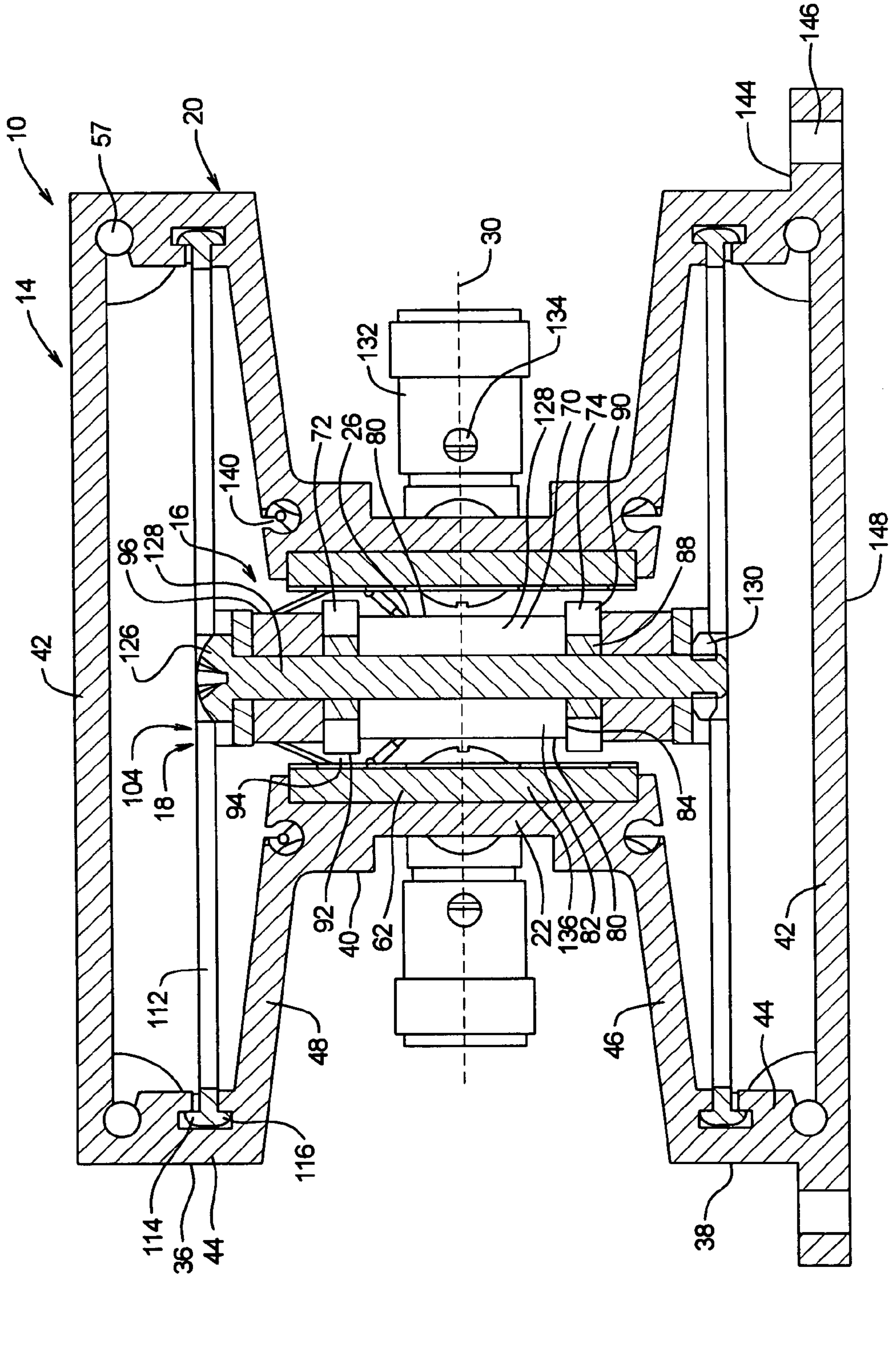
FIG. 2 is a transverse sectional view of a first embodiment, taken generally along line 2-2 of FIG. 3.

The first embodiment of the acoustic wave generating apparatus 10 of the present invention will now be described more generally with reference to FIGS. 2 through 8. Reference will first be made to FIG. 2, which is a cross sectional view of this apparatus 10 of the first embodiment taken approximately at line 2-2 of FIG. 3.

In this first embodiment of the apparatus 10, in terms of function most all of the components of this embodiment will be part of either a mounting section 14 or an inertial section 16. These two sections 14 and 16 are operatively connected to one another by an interconnecting positioning and force transmitting section 18 in a manner that the inertial section 16 reciprocates relative to the mounting section 14.

The mounting section comprises a housing 20, which is shown attached to the chair 12 to transmit to the seat of the chair 12 the inertial forces generated by the relative reciprocating motion between the inertial section 16 and the mounting section 14. (For convenience, in the following text the interconnecting positioning and force transmitting section 18 will simply be referred to as the interconnecting section 18).

The relative reciprocating movements of the sections 14 and 16 is accomplished by means of a drive section 22 which comprises two main components, namely a coil section 24 that is fixedly mounted in the housing 20 as part of the mounting section, and a magnet section 26 which is a major part of the inertial section 16. To facilitate the description of this first embodiment, the apparatus 10 will be considered as having a longitudinal axis 28 (FIG. 3), a transverse axis 30 (FIG. 2) perpendicular to the longitudinal axis 28; and a vertical axis 32 which is perpendicular to both the longitudinal axis 28 and the transverse axis 30.

The terms "upper" and "lower" shall be used in this text for convenience of description, with the understanding that in actual practice, the apparatus 10 could be positioned in different orientations where the apparatus 10 could be at an inverted orientation, or in a lateral orientation, etc.

Figure 10:
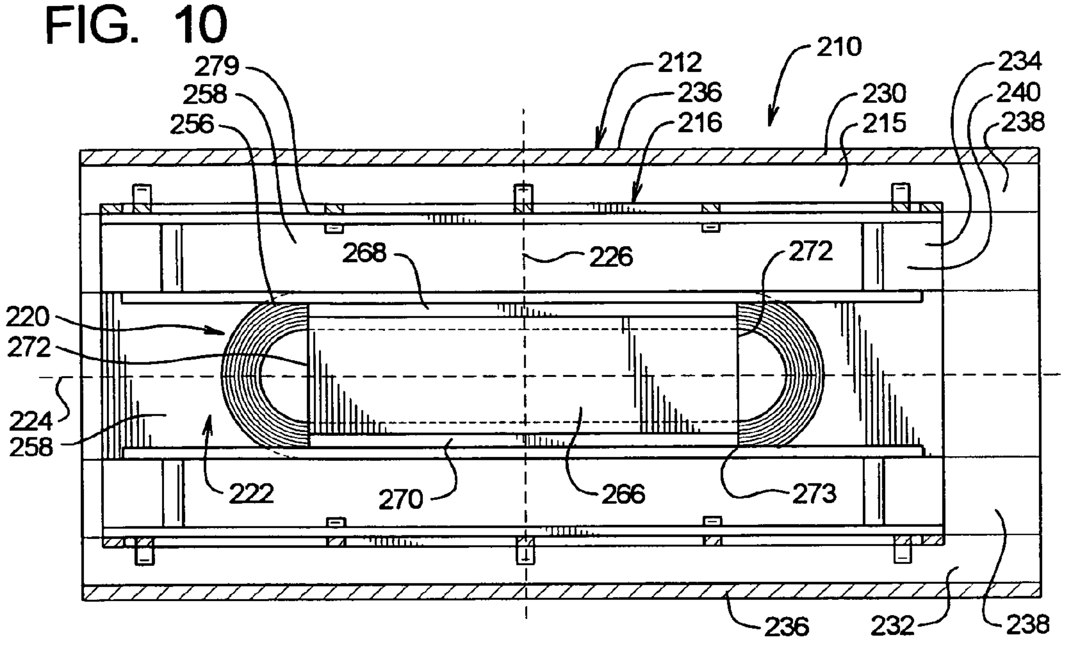
FIG. 10 is a sectional view taken along line 10-10 of FIG. 9.
Figure 11:
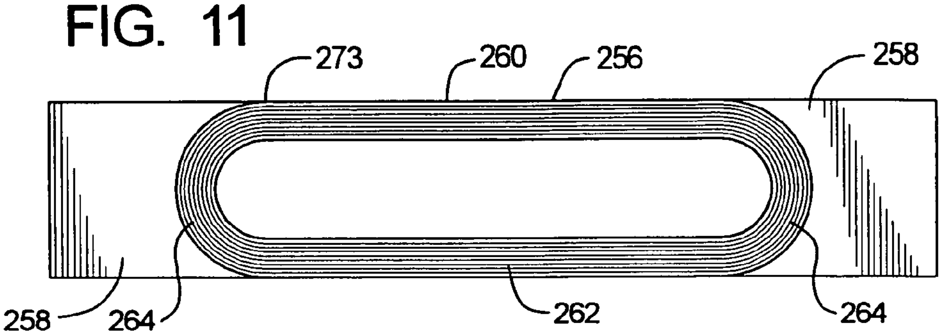
FIG. 11 is a view taken from the same viewing location as in FIG. 10, showing one coil of the coil section.
Figure 12:
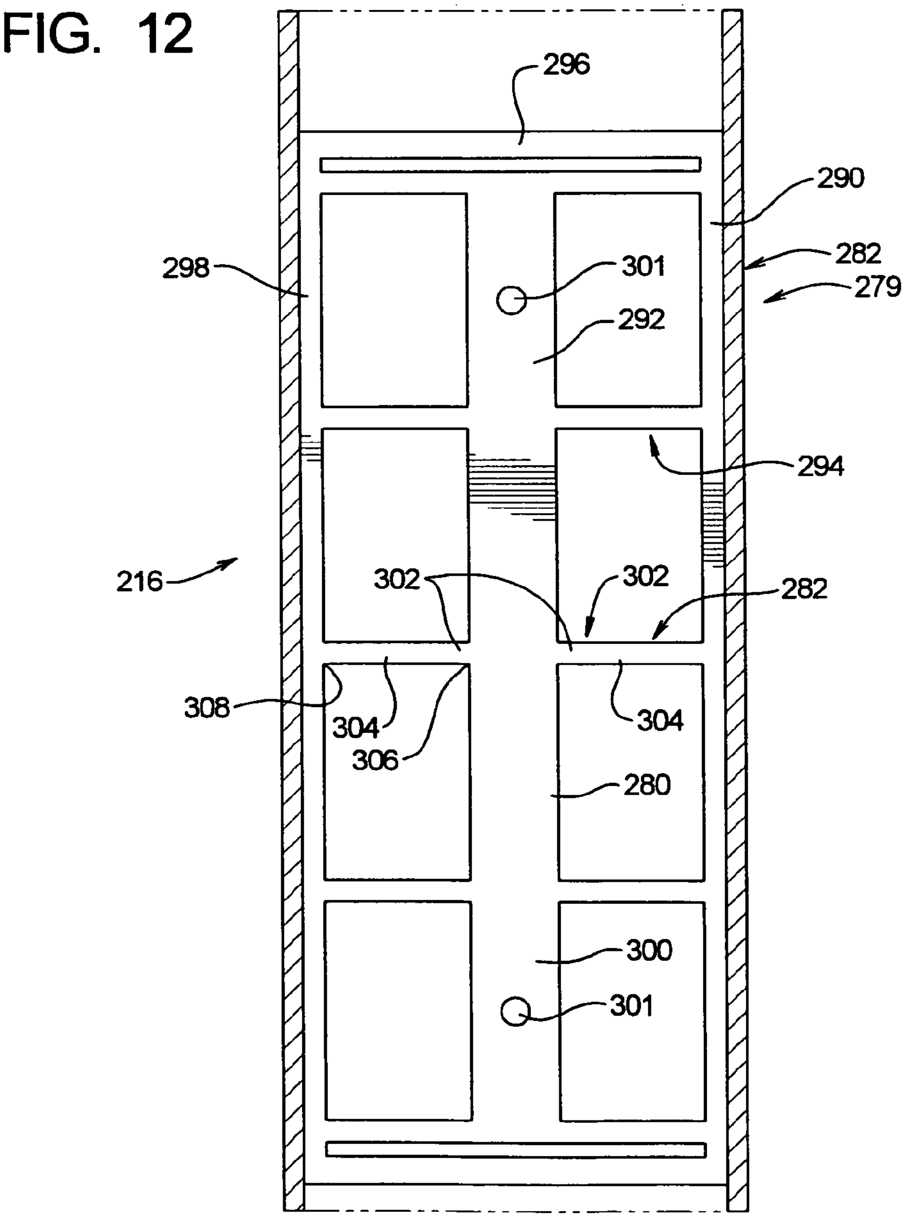
FIG. 12 is a plan view taken along line 12-12 of FIG. 9, illustrating an interconnecting section of the first embodiment.

As indicated earlier in this text, this embodiment of the apparatus 10 is designed to generate acoustic waves and transmit these directly into a structure, such as a seat platform 33 of the chair 12. In FIG. 10, the apparatus 10 is shown as having the housing 20 of the mounting section 12 directly connected to the bottom panel of a seat platform 33 of a chair 12. In this first embodiment the low frequency acoustic wave is generated by transmitting an amplified low frequency audio signal (e.g. 40 to 45 Hz) into the coil section 24 of the drive section 22, causing a relative oscillating movement (i.e. back and forth movement) of the inertial section 16 relative to the mounting structure 14 which in turn causes the acoustic wave to be transmitted directly into the chair seat as shown in FIG. 1. At the same time, there can be a speaker (shown schematically at 34) or earphones transmitting audible musical sound waves to the listener, and the low frequency acoustic waves can coincide with those of the audible musical sound waves. The effects of this will be discussed later in this text.

Also, present analysis indicates that the apparatus 10 is able to generate and transmit (in addition to a lower frequency base waves) tactile and/or acoustic waves up to 300 or possibly up to even 600 Hz or higher. More specifically the frequencies could range from a base frequency (e.g. 40 to 45 Hz) upwardly in 5 Hz increments (i.e., 50 Hz, 55 Hz, etc.) up to the 600 Hz level (or possibly higher). Also, the fundamental or base frequency could vary from 40 to 45 Hz downward in 5 Hz increments to even about 20 Hz.

b) A More Detailed Description of the First Embodiment

Figure 7:
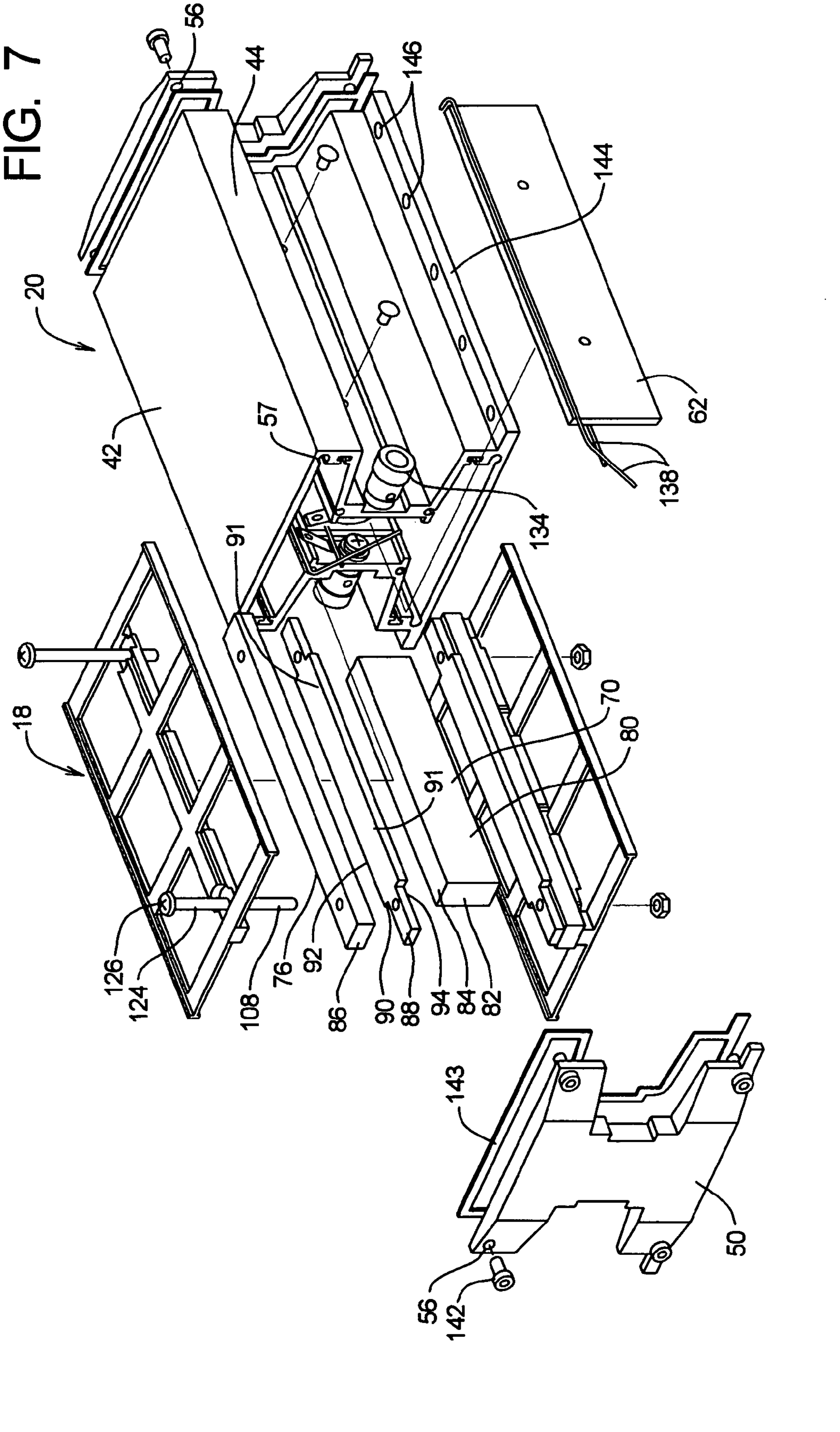
FIG. 7 is a partially exploded isometric view of the first embodiment of FIGS. 2-6.
Figure 8:
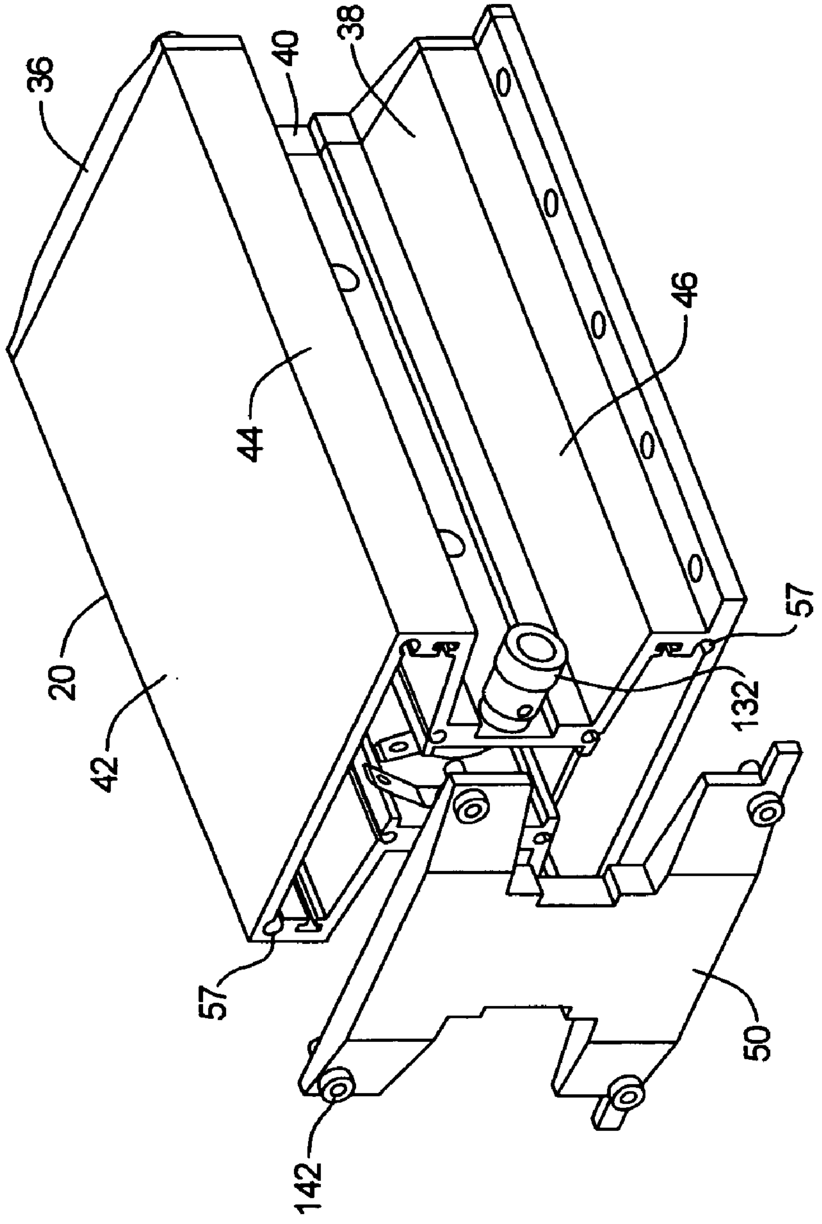
FIG. 8 is a isometric view of the housing of the apparatus of FIG. 7, with one of the end covers being removed for purposes of illustration.

To begin now, the more detailed description of the apparatus 10 of this first embodiment, reference is again made to FIG. 2, and also to FIG. 7. It can be seen that in cross section the housing 20 has a main housing section 35 which has what can be described as an exaggerated hour glass configuration or an I beam configuration, and is made up of three sections, namely, upper and lower housing sections 36 and 38 of a greater width dimension, and a middle section 40 having a lesser width dimension. The upper and lower housing sections 36 and 38 are identical (or substantially identical) to one another, so the following description of the upper housing section 36 is meant to apply as well to the lower housing section 38.

The upper section 36 of the housing structure 20 has a top plate 42 which has an overall rectangular platform configuration and two rectangular side plates 44 extending downwardly from lateral outside edges of the upper plate 42. The lower edges of the side plates 44 each connect to inwardly extending transition plates 46 that have an inward and moderately downward slope. The lower housing section 38 of the housing 20 likewise has a bottom plate 42, the side plates 44, and the inwardly and moderately upwardly sloping transition plates 46, so that the lower section 38 is a mirror image of the upper section 36.

The middle housing section 40 comprises two rectangular intermediate vertically and longitudinally aligned parallel middle side plates 48 having upper and lower edge portions which join to, respectively, the inner edge portions of the upper transition plates 48 and to the inner edges of the lower transition plates 46.

The housing structure 20 also comprises two end plates 50 which may be substantially identical to one another and which are positioned at opposite ends of the main housing section 35. These can best be seen in FIG. 7. For purposes of illustration, one of the two end plates 50 is shown as being separated from the housing structure 12. The second end plate 50 is connected to the opposite end of the housing structure 10 and only two edge portions 52 and 54 can be seen. The two end plates 50 each have four corner located openings 56 to match with corner openings 57 of the housing section 35, so that the end plates 50 can be joined to the end portions of the main housing section 35 by connecting screws, bolts or other connectors.

The housing 20 of the mounting section 14 can be made of metal, plastic or some other material as a rigid unitary structure, such as being made by being machined, molded, extruded, caste and/or made of components welded, bonded, or otherwise joined to one another.

Figure 4:
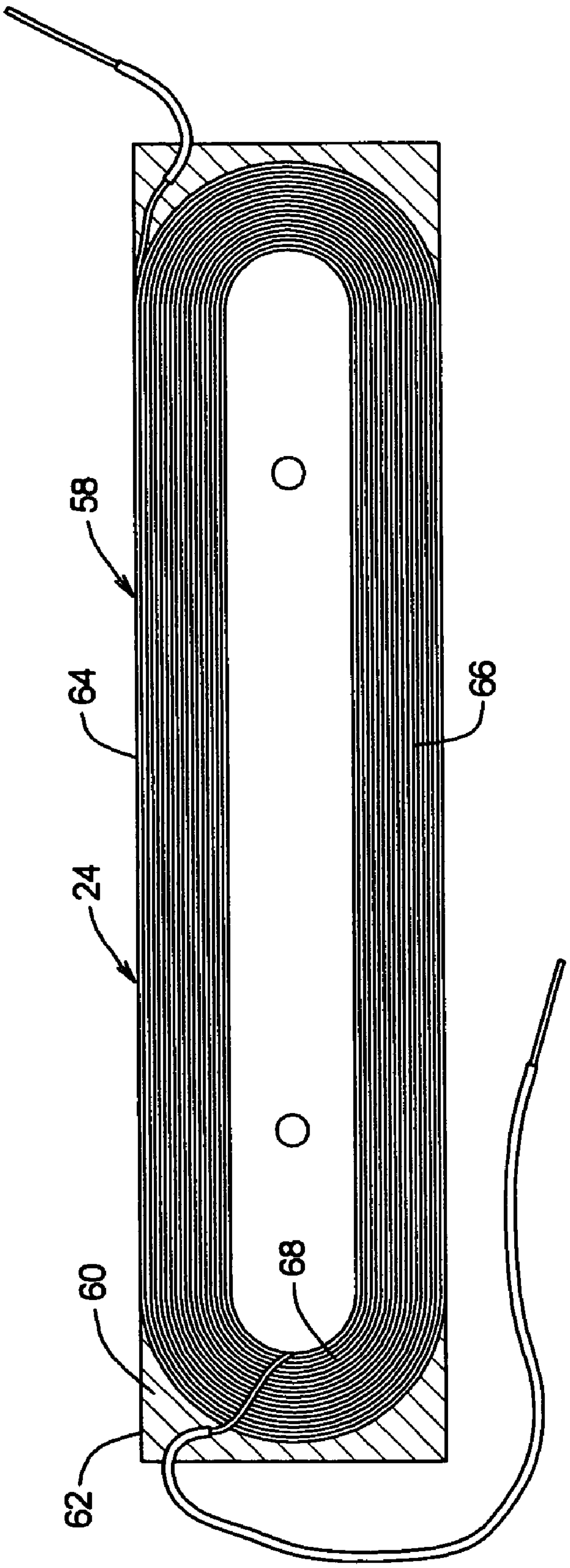
FIG. 4 is a side elevational view showing only one coil of the coil section of this embodiment of FIGS. 2 and 3.

The aforementioned coil section 24 comprises two coils 58 which are positioned on opposite sides of the magnet section 26. As can be seen in FIG. 4, each coil 58 is fixedly connected to the interior surface 60 of one of two rectangular magnetically permeable return path steel plates 62 that are in turn connected to the interior surfaces of the side plates 48 of the middle housing section 34 of the housing 20. These plates 62 are also considered to be part of the coil section 24 and are thus also part of the mounting section 14. The two coils 58 are (or may be) identical, and each has a "racetrack" configuration, where there are upper and lower longitudinally aligned linear parallel middle coil sections 64 and 66 respectively, with the adjacent end portions of these two coil sections 64 and 66 being connected by oppositely positioned end coil portions 68 which in this embodiment are with 180.degree curves with the coil sections 64 and 66 having a straight line configuration. Each of these coils 58 has multiple windings, and each winding can be made in the form of a flat ribbon of an electrically conductive material which is coated by a suitable insulating material and which is wound in layers to form the "racetrack".

The aforementioned magnet section 26 comprises a rectangularly shaped magnet 70, upper and lower pole plates 72 and 74, respectively, fixedly connected to the upper and lower surfaces of the magnet 70, and upper and lower tuning members in the form of rectangular tuning blocks 76 and 78 positioned against and fixedly connected to the upper and lower surface of the pole plates 74 and 76, respectively. These tuning blocks 76 and 78 may be made of brass.

The configuration of the magnet 70 is a rectangular prism having parallel side surfaces 80, parallel end surfaces 82, and parallel upper and lower surfaces 84, with each of these surfaces 80, 82, and 84 having a rectangular configuration, with adjoining surfaces meeting at a right angle. The tuning blocks 76 and 78 each have the configuration of a right angle rectangular prism, having parallel side surfaces, parallel bottom and top surfaces, and parallel end surfaces 86 (the side surfaces and upper and lower surfaces not having numerical designations simply for the purpose of illustration so that the drawings do not become too cluttered with numerals). The end surfaces 86 of the tuning blocks 76 and 78 extend a moderate distance beyond the end surfaces 82 of the magnet 70.

The two pole pieces, 72 and 74, each have the overall configuration of a rectangular prism, except that each corner portion of the pole pieces at its end locations has a cutout to form the two end portions 88 of each pole piece 72 and 74 of a reduced width dimension that is less than the width dimension of the main middle portion 71 of the magnet 70 (see FIG. 2 where the transverse surfaces at the base of the end portion 88 are designated 90, and also FIG. 7).

However, the middle section 91 of the pole pieces 72 and 74 which extend between the end portions 82 of the magnet 70 have a width dimension moderately greater than that of the magnet 70 so that the side surfaces 92 of middle portions 91 of the pole pieces 72 and 74 extend laterally a short distance beyond the side surfaces 80 of the magnet 70. Thus, these side surface portions 92 of the middle portions of the upper and lower pole pieces 72 and 74 define upper and lower longitudinally extending flux gaps 94 (see FIG. 2) which are positioned so that when the magnet section 26 is in its middle neutral position, the side surface portions 92 of the middle portions pole pieces 72 and 74 are centered relative to the upper and lower middle coil sections 64 and 66. These flux gaps 94 are in large part occupied by the longitudinally aligned coil portions 64 and 66.

The side surfaces 96 of the two tuning blocks 76 and 78 are vertically aligned with the side surfaces of 80 of the magnet 70, and the end surfaces 86 of the tuning blocks 76 and 78 are transversely and vertically parallel to the end surfaces of the pole pieces 72 and 74.

The magnet 70, the pole pieces 72 and 74, and the tuning blocks 76 and 78 are stacked one on top of the other as shown in FIG. 2 so that these are all in vertical alignment with each other, and centered along the longitudinal axis.

Figure 3:
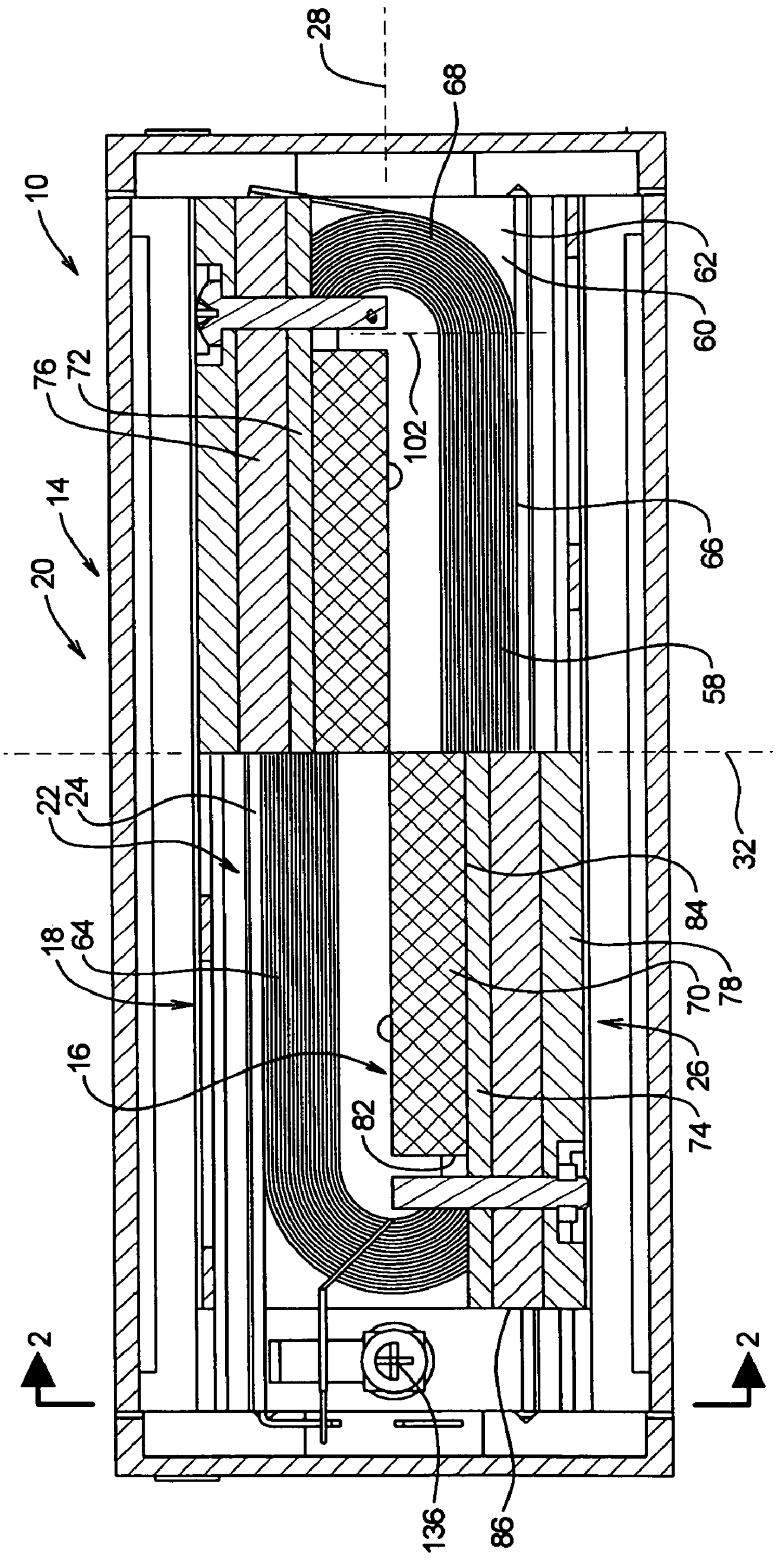
FIG. 3 is a sectional view of the embodiment of FIG. 3 taken generally along a longitudinal axis, and showing cross sections at different locations located in the four quadrants of FIG. 3.

As can be seen in viewing FIGS. 3 and 7, the transversely and laterally aligned end surface portions 82 of the magnet 70 and the transversely aligned corner surface portions 90 of the pole pieces 72 and 74 lie in the same transverse vertical plane and terminate a short distance longitudinally inwardly from the location (indicated by the line 102) in FIG. 3 where the end curved coil end portions 68 of the two coils 58 join integrally to the upper and lower straight coil sections 64 and 66. Also, as can be seen in FIG. 2, the lateral outer side surfaces 92 of the main middle portions 91 of the two pole pieces 72 and 74 are positioned a short distance beyond the side surfaces 80 of the magnet 70 to form the upper and lower relatively narrow gaps 94 in which the upper and lower longitudinally aligned coil sections 64 and 66 are located.

As can be seen in FIG. 2, the magnet section 22 is in a neutral center position so that the two pole plates 72 and 74 are positioned at the mid height of, respectively, the upper and lower intermediate straight coil sections 64 and 66.

Figure 5:
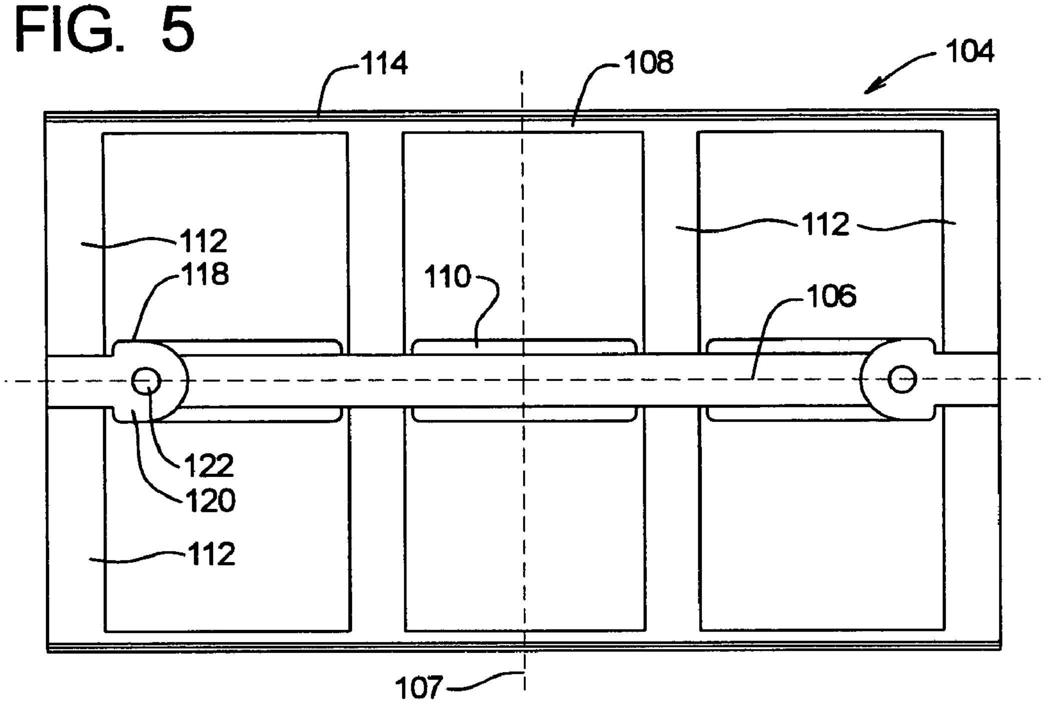
FIG. 5 is a plan view of one of the interconnecting frame subsections of the first embodiment.
Figure 6:
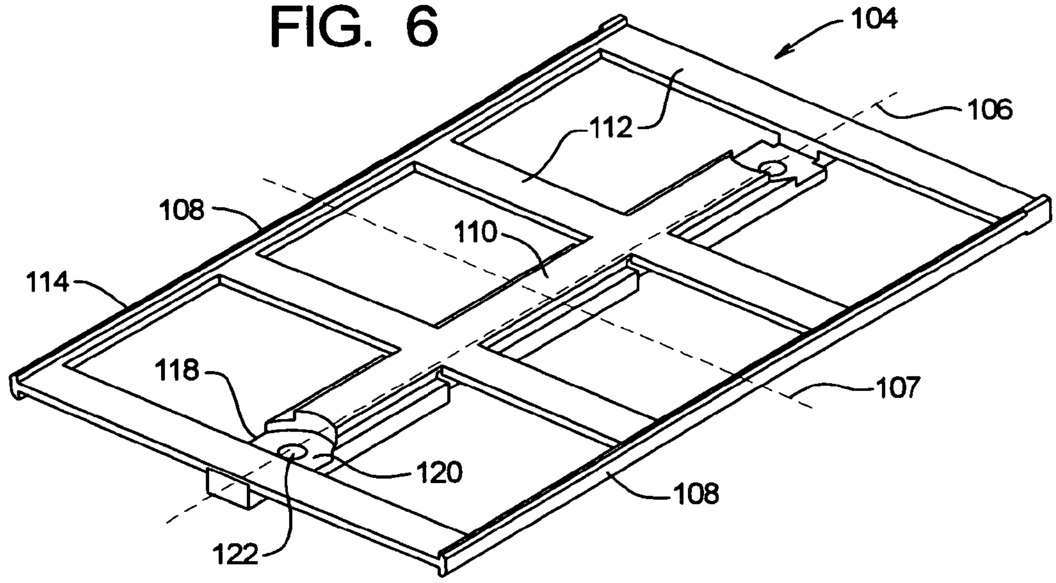
FIG. 6 shows the interconnecting frame section of FIG. 5 in an isometric view.

The aforementioned interconnecting positioning and force transmitting section (now referred to as the "interconnecting section 18") comprises upper and lower interconnecting subsections in the form of interconnecting frames 104, (see FIGS. 5 and 6). These upper and lower frames 104 are (or may be) identical (or substantially identical to one another), except for being mirror images of one another. Accordingly, the following description of the upper frame 104 is intended to apply to the lower frame 104.

Each of the interconnecting frames 104 can be considered as having a longitudinally aligned lengthwise center axis 106 which is spaced vertically from, and vertically aligned with, the main longitudinal axis 28 and a transverse axis 107. Each frame 104 comprises a pair of longitudinally aligned housing connecting portions in the form of connecting edge members 108, a center longitudinally aligned magnet connecting portion in the form of a connecting member 110, and two intermediate connecting portions 111, which are on opposite sides of the lengthwise center axis in the form of a plurality of cross members 112. These members 108,110 and 112 can be made as a single integral molded plastic piece.

Each of the housing connecting edge members 108 comprises a longitudinally extending connecting flange or rib 114 which has a vertically aligned width dimension moderately greater than the thickness of its adjacent cross member 112, so as to have upper and lower portions forming upper and lower elongate raised portions relative to the cross member 112. Each side plate 44 of the housing 20 has formed at an inner surface a longitudinally aligned slot 116 (see FIG. 2), which has a "T" shaped cross section so as to have an expanded interior portion and a narrower longitudinal gap. Thus, when the flange or rib 114 is aligned with its related slot 116 and slid into engagement, the flange or rib 114 is retained in its slot 116.

The magnet connecting member 110 has two connecting end portions 118, with each end portion 118 having a flattened moderately recessed upper surface portion 120 with a through opening 122 extending downwardly from the flat recessed surface portion 120 (see FIG. 2) to receive a screw or bolt 124. The head 126 of the screw or bolt 124 (see FIG. 2) presses against the surface portion 120, with the shank 128 extending through the opening 122 and through openings made in the end portions of the pole pieces 72 and 74 and of the tuning blocks 76 and 78 (see FIGS. 2 and 7). There is a fastener 130 at the lower end of the screw or bolt 124. Thus, the two bolts 124 at opposite end portions 86 of the pole pieces 72 and 74 and of the tuning blocks 76 and 78 make a rigid connection of these components with the two magnet connecting members 110 of the interconnecting frames 104, with the magnet 70 sandwiched in the middle, so that these components (i.e. the magnet 20, the pole pieces 72 and 74, the tuning blocks 76 and 78, and the magnet 70 along with the central portions of the frames 104) function as one unit which comprises the inertial section 16.

The cross members 112 are arranged in four transversely aligned pairs which extend transversely between the two housing connecting edge members 108 and the magnet connecting member 110. At the center location of each of these cross members 112, the cross members 112 are fixedly joined to the centrally located magnetic connecting member 110. (As indicated earlier herein, this entire interconnecting subsection 104 can be made as one integral plastic piece molded as a single piece.) Thus, these cross members are anchored at the middle location to function as cantilever beam suspension members for the magnet section 26.

The vertical thickness dimension of the magnet connecting member 110 is substantially greater than that of the cross members 112. The horizontal width dimensions of the cross members 112 are substantially greater than their vertical thickness dimensions so that the cross members 112 are sufficiently resilient to enable the magnet section to move back and forth in a vertical direction and yet provide a sufficient restoring force to bring the magnet section 26 back toward its neutral position, but are highly resistant to any transverse or longitudinal movement.

A pair of wire terminals 132 are mounted at the outside surface portions of the front end of each of the middle side plates 48. Each terminal 132 has an outside connecting location 134 (see FIG. 7) and is retained in its mounted position by means of a connecting screw 136 (see FIG. 7). The wires extending from the terminals 132 to the coils 58 are designated 138. Longitudinally aligned connecting channels 140 (see FIG. 2) are provided in the housing 20 at juncture locations of the side plates 48 and the transition plates 46.

c) Assembly and Operation of the First Embodiment

To assemble the apparatus 10, the magnet section 26 can be assembled by placing the magnet 70, the pole pieces 72 and 74, the tuning blocks 78 and the interconnecting frames 74 in the proper stacked relationship and then connecting these together by means of the screws or bolts 124. Then this assembly can be placed in alignment with the housing 20, and then moved into the chamber 140 defined by the housing 20. The internal wire connections are made between the wire terminals 132 and the coils 58. Then the end plates 50 can be connected to the end portions of the main housing structure 20 and connected by the connecting screws 142 at the sealing openings 56. A sealing gasket 143 can be provided for each of the end plates 50.

The lower plate 42 of the lower housing section 38 has along its outer edges a pair of oppositely positioned laterally extending mounting flanges 144 (see FIG. 4), with each flange 144 being provided with a plurality of connecting openings 146 at evenly spaced locations along its length. To mount the apparatus 10 to a structure, such as the panel 34 of the chair 12, lower plate 42 of the housing 20 is placed against the panel 34 of the chair 12 and then bolts or fastening screws are inserted through the openings 146 to connect the apparatus 10 firmly to the chair panel 34.

With the apparatus 10 assembled, the electrical connections made, and the apparatus 10 connected to the panel 34 of the chair seat, the low frequency amplified signal is transmitted through the terminals 132 to cause the two electric currents to pass through the coils 58. The interaction of the magnetic fields created by the current flow through the coils 58 with the magnetic field of the magnet section 26 to cause the up and down movement of the magnet section 26 along with the entire inertial section 16.

As described previously in this text, the magnet section 26 is normally in the neutral position where the upper and lower middle or intermediate linear coil sections 64 and 66 are centered in the gaps 94 defined by the central portions 91 of the pole pieces 72 with the adjacent portions of the return path side plates 62, with the upper and lower intermediate coils sections 64 and 66 being located in those gaps 94.

Thus, the oscillating electromagnetic force causes the magnet section 26 to move upwardly and downwardly in the chamber 140 defined by the housing 20. The magnet section 26, functioning as part of the inertial mass 16, then oscillates upwardly and downwardly relative to the mounting structure 14 which comprises mainly the housing 20 along with the return path plates 62 and the other components that are fixedly attached to the housing 20.

As the inertial structure 16 moves in an oscillating manner upwardly and downwardly, there is an equal and opposite reaction transmitted from the housing 20 into the chair panel 36. To describe this more specifically, as the magnetic fields in the coils 58 create a force to move the magnet section 26 as part of the inertial structure 16 in one direction, the inertial force generated by the accelerating inertial structure 16 is reacted back through the magnetic field through the coils 58 which are fixedly connected to the return path side plates 62, and this therefore would thrust the mounting structure 14 in the opposite direction.

However, as this is happening, the interconnecting positioning and force transmitting section 18, (called mostly the "interconnecting section 18" in this text), in the form of the interconnecting frame portions 104 are being moved from the neutral position with the cross arms 112 resisting this movement. Since these cross arms 112 are made of a resilient material, there is a spring action by which they are resisting the relative movement of the mounting structure 14 and the inertial structure 16 away from the neutral position.

Then when the current in the coils 58 is reversed, the field created by the coils 58 would exert a force to move the inertial structure 16 and the mounting structure 12 back toward their neutral position relative to one another. Also, the spring action of the cross arms 112 would exert a force to move the mounting structure 14 and the inertial structure 16 back to the neutral position.

Thus, it is apparent the inertial section 16 and the mounting section, coupled with the spring action of the cross members 112 form a spring mass system which would have a resonant frequency. Assuming that the resonant frequency of this spring mass system is approximately the same as (or close to being the same as) the frequency of the amplified audio signal the action of this spring mass system would reinforce the forces created by the drive section 22 made up of the coil section 24 and the magnet 26.

The resultant force of the relative back and forth movement of the inertial structure 16 and the mounting structure 14 is reacted into the panel 33 of the seat of the chair 12. Thus, the panel 34 of the chair 12 will have a back and forth movement along with the housing 20 and the other components of the inertial section, and this results in the tactile wave traveling through the structure of the chair 12.

To discuss another feature of this embodiment of the present invention, as indicated earlier in this text, there are first and second mass selectable brass tuning blocks 76 and 78. By adding or subtracting mass from these tuning blocks 76 and 78, the resonant frequency of the spring mass system can be changed. This could produce benefits in various ways.

For example, if the apparatus 10 were used in a specific piece of furniture, such as a chair, the panel or other structure to which the apparatus 10 is mounted may have certain characteristics relative to its mass, resistance to its movement, degree of resilience, etc. This may affect the resisting force provided by the chair or other object to which the apparatus 10 is mounted. Therefore, an adjustment could be made in the mass of these tuning blocks 76 and 78, to optimize the interaction of these components.

2) A Second Embodiment

Figure 9:
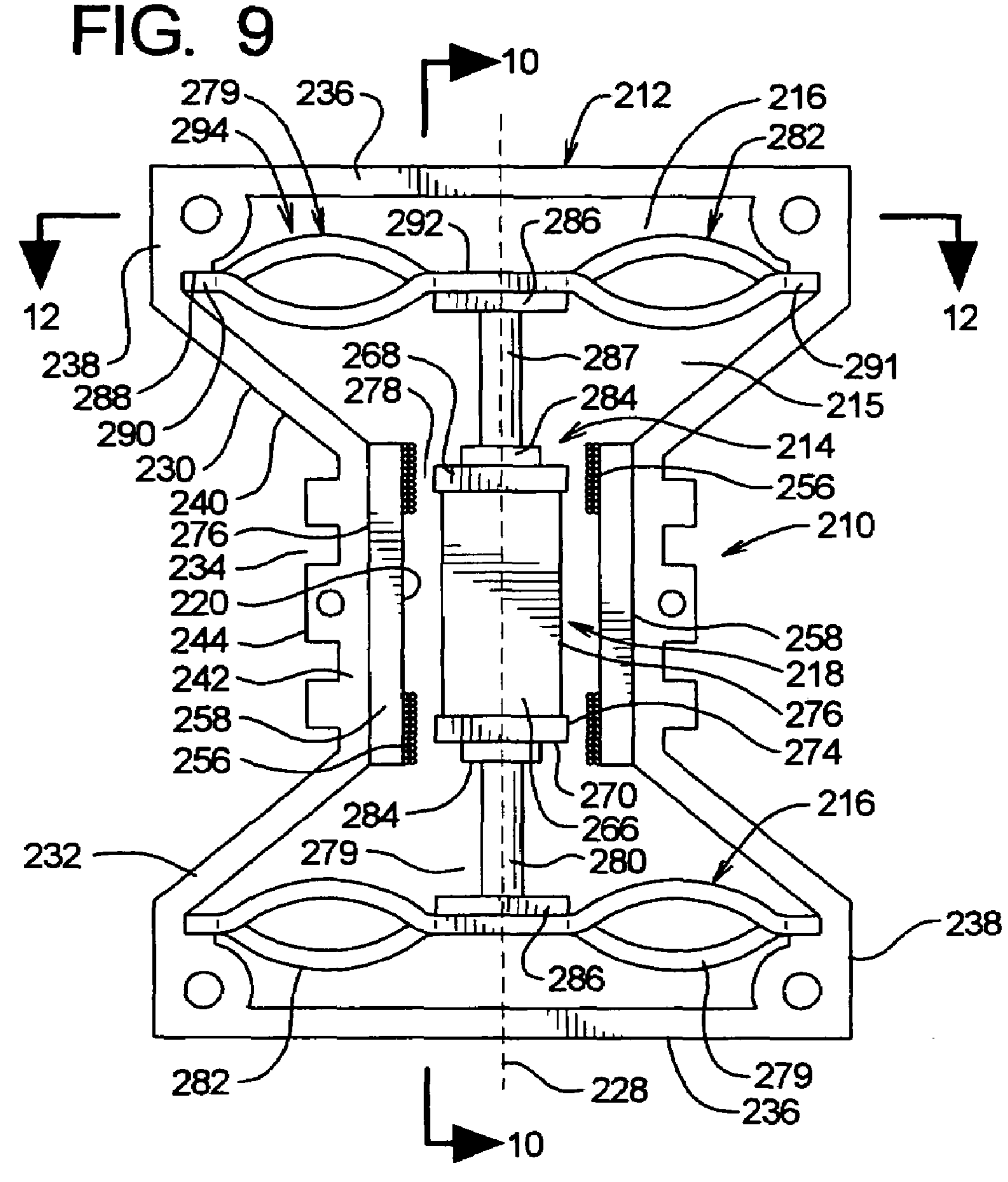
FIG. 9 is a cross sectional view of the apparatus of a second embodiment, with a cross section being taken perpendicular to the longitudinal axis.

A second embodiment of an acoustic wave generating apparatus 210 of the present invention will now be described with reference to FIGS. 9 through 15. Reference will first be made to FIG. 9, which is a cross sectional view taken transversely across a midsection of this apparatus 210 of the first embodiment.

In this second embodiment of the apparatus 210, there is a mounting section 212 and an inertial section 214, which is positioned in a chamber 215 of the mounting section 212. These sections 212 and 214 are operatively connected to one another by an interconnecting positioning and force transmitting section 216 in a manner that the inertial section 214 reciprocates relative to the mounting section 212 in the chamber 215. (For convenience, as in the description of the first embodiment, in the following text the interconnecting positioning and force transmitting section 216 will simply be referred to as the interconnecting section 216).

As in the first embodiment, the relative reciprocating movements of the sections 212 and 214 is accomplished by means of a drive section 218 which comprises two main components, namely a coil section 220 that is mounted in the mounting section 212, and a magnet section 222 which is a major part of the inertial section 214. To facilitate the description of this first embodiment, the apparatus 210 will be considered as having a longitudinal axis 224 (FIG. 10), a transverse axis 226 (FIG. 10) perpendicular to the longitudinal axis, and a vertical axis 228 which is perpendicular to both the longitudinal axis 224 and the transverse axis 226 (FIG. 9).

As in the description of the first embodiment, the terms "upper" and "lower" shall be used in this text for convenience of description, and in actual practice, the apparatus 210 could be positioned in different orientations such as an inverted orientation, a lateral orientation, etc.

With further reference made to FIG. 9. It can be seen that in cross section the mounting section 212 has what is more of an hour glass configuration, and is made up of three sections, namely, upper and lower sections 230 and 232 of a greater width dimension, and a middle section 234 having a lesser width dimension. The upper and lower sections 230 and 232 are or may be identical (or substantially identical) to one another, so the following description of the upper section 230 is meant to apply as well to the lower section 232.

The upper section 230 of the mounting section 212 has a top plate 236 which has an overall rectangular configuration and two rectangular side plates 238 extending downwardly from lateral outside edges of the upper plate 236. The lower edges of the side plates 236 each connect to inwardly and downwardly sloping transition plate sections 240. The lower section 230 of the mounting section 212 likewise has the bottom plate 236, the side plates 238 and the upwardly and inwardly extending transition plate sections 240, so that the lower section 232 is a mirror image of the upper section 230.

The middle section 234 of the mounting section 212 comprises two rectangular intermediate side plates 242 having upper and lower edge portions which join to, respectively, the lower edge portions of the upper transition plate sections 240 and to the upper edges of the lower transition plate sections 240. Also, the sidewalls 242 of the middle section 234 may have a plurality of laterally and outwardly extending ribs 244 which can function as heat dissipating members or fins. Also, these ribs 244 have the benefit of adding structural strength and stiffness.

Figure 15:
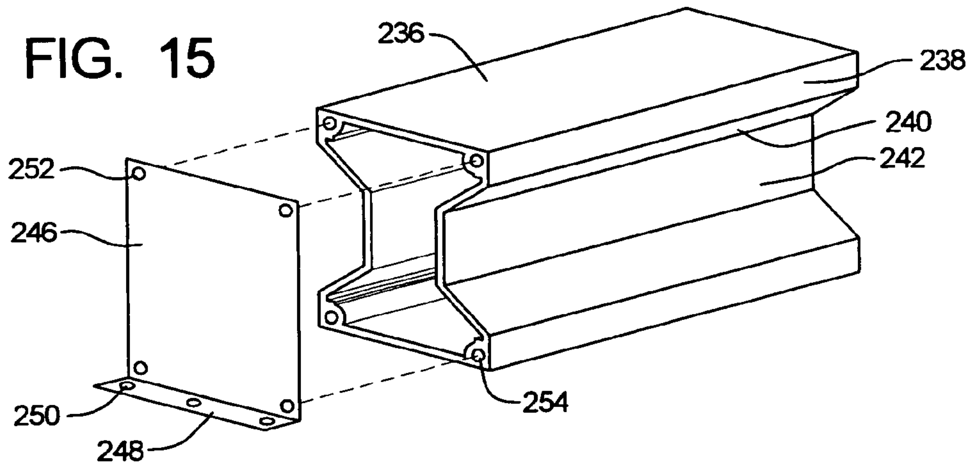
FIG. 15 is an isometric view showing the mounting structure of the second embodiment.

As in the first embodiment, the three sections 230, 232 and 234 of the mounting section 212 can be made of metal, plastic or some other material as a rigid unitary structure, such as being made by being machined, molded, extruded, cast and/or made of components welded or otherwise joined to one another. In FIG. 15, the mounting structure 212 is shown in an isometric view, and there is shown an end plate 246 which can be joined to an open end portion of the mounting structure 212. While not shown in FIG. 15, a similar end plate 246 would be connected to the opposite end of the mounting section 212.

The two end plates 246 each have a mounting flange 248 at right angles to the end plate 246, and the mounting flanges 248 can be used to form the section 212 to a bottom panel of a chair such as that shown in FIG. 1. The flanges 248 can be provided with openings 250 by which this connection can be made. Also, the two end plates 246 are shown provided with four corner located openings 252 to match with corner openings 254 of the mounting sections 212 so that the end plates 246 can be joined to the end portions of the mounting structure 212 by screws, bolts or other connectors.

The aforementioned coil section 218 is made up of two coils 256 (see FIGS. 10 and 11), of the coil section with each coil 256 being mounted to the interior surface of one of two rectangular magnetically permeable return plates 258 that are in turn connected to the interior surfaces of the side plates 242 of the middle section 234 of the mounting section 212. The two coils 256 are (or may be) identical and each has a "racetrack" configuration, where there are upper and lower intermediate straight longitudinally aligned coil sections 260 and 262 respectively, with the end portions of these two sections 260 and 262 being connected by oppositely positioned 180 degree curved end coil portions 264. Each of these coils 256 has multiple windings, and each winding could be made in the form of a flat ribbon of an electrically conductive material which is coated by a suitable insulating material that is wound in layers to form the "racetrack".

The aforementioned magnet section 222 comprises a rectangularly shaped magnet 266 and upper and lower pole plates 268 and 270, respectively, fixedly connected to the upper and lower surfaces of the magnet 266. As can be seen in FIG. 10, the lengthwise dimension (the dimension along the longitudinal axis 224) of the magnet 266 and the pole pieces 268 and 270 are the same, and the transversely and vertically aligned end surface portions 272 of the magnet 266 with its pole plates 268 and 270 terminate a short distance inwardly from the location 273 at which the end curved coil portions 264 of the two coils 256 join integrally to the upper and lower straight coil sections 260 and 262. Also, as can be seen in FIG. 9, the lateral outside edges 274 of the two pole plates 268 and 270 are positioned a short distance beyond the lateral flat surfaces 276 of the magnet 266 to form the upper and lower flux gaps 278 at which the upper and lower longitudinally aligned coil sections 260 and 262 are located.

As can be seen in FIG. 9, the magnet section 222 is in a neutral center position so that the two pole plates 268 and 270 are positioned at the mid height of, respectively, the upper and lower intermediate straight coil sections 260 and 262.

The aforementioned interconnecting positioning and force transmitting section (now referred to as the "interconnecting section 216") comprises upper and lower interconnecting subsections 279. These upper and lower subsections 279 are (or may be) identical (or substantially identical), except for being mirror images of one another. Accordingly, the following description of the upper subsection 279 is intended to apply to the lower subsection 279.

Each of these interconnecting subsections 279 comprises a magnet interconnecting section 280 and an interconnecting frame section 282.

Each magnet interconnecting section 280 comprises a magnet connecting plate 284 (see FIG. 9) which is positioned against and connected to the upper surface of the upper and lower pole plates 268 and 270 respectively. Each magnet interconnecting section 280 further comprises a frame connecting plate 286 (see FIG. 9) which is spaced upwardly (or downwardly for the lower magnet interconnection section 280) from its related magnet connecting plate 284. There is a pair of connecting posts 287 (see FIG. 9) for each magnet interconnecting section 280, and these are spaced at opposite end locations of each pair of the magnet connecting plate 284 and frame connecting plate 286.

The interconnecting frame section 282 is mounted into the mounting structure 212 at a location which is near to the connection of the side plates 238 with the upper (lower) transition plate sections 240. There is a downwardly facing shoulder 288 which extends longitudinally at a location spaced moderately below the perimeter portion of the upper and lower plates 36 (see FIG. 9).

Each interconnecting frame section 282 (See FIG. 12) comprises a mounting structure connecting frame portion 290, a magnet connecting frame portion 292, and an interconnecting frame portion 294. The mounting structure connecting frame portion 290 is in the form of a perimeter frame having opposite end portions 296 and side portions 298. The magnet interconnecting frame portions each comprise a longitudinally extended and centrally located elongate connecting plate 300 having a rectangular configuration, and having longitudinally spaced connecting locations shown herein as connecting openings 301 (see FIG. 12) by which a fastener (e.g. a bolt, a screw, etc.) can be made to an upper end of the aforementioned connecting post 288.

The frame interconnecting portion 294 functions as a resilient connection between the mounting section connecting frame portion 290 and the magnet connecting frame portion 292. In this second embodiment, this frame interconnecting portion 204 comprises transversely aligned pairs 302 of connecting arms 304, with each arm having an interconnecting end 306 by which it connects to the magnet interconnection frame portion 292, and an outer end 308 connecting to a related side portion 298 of the perimeter frame interconnecting portion 290. In the plan view of FIG. 12, it can be seen that there are five pairs 302 of the connecting arms 304, being positioned at evenly spaced longitudinally intervals along a major portion of the length of the interconnecting frame 282. In this particular arrangement, the two end portions 296 of the mounting section connecting frame portion 290 are spaced only a very short distance from the two end pairs 302 of connecting arms 304, and as shown in the drawings, there are an additional three pairs 302 connecting arms 304 positioned at the evenly spaced intervals between the two outermost pairs 302. The interconnecting frame section 294 may be made as a single integral structure so that both of the connecting end of the arms 304 have what can be termed as a cantilever connection, so that the arms 304 functions as cantilever beams that are fixedly connected at opposite end portions.

Figure 13:
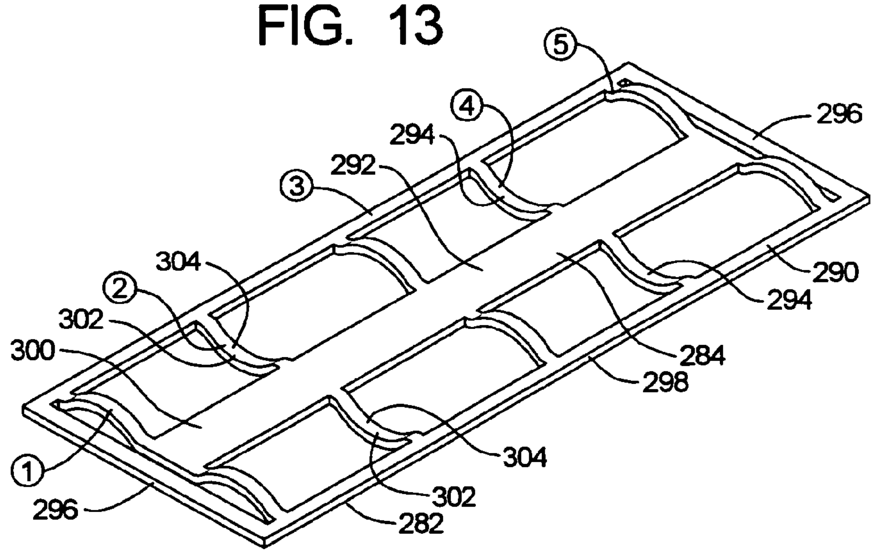
FIG. 13 is an isometric view of FIG. 12.
Figure 14:
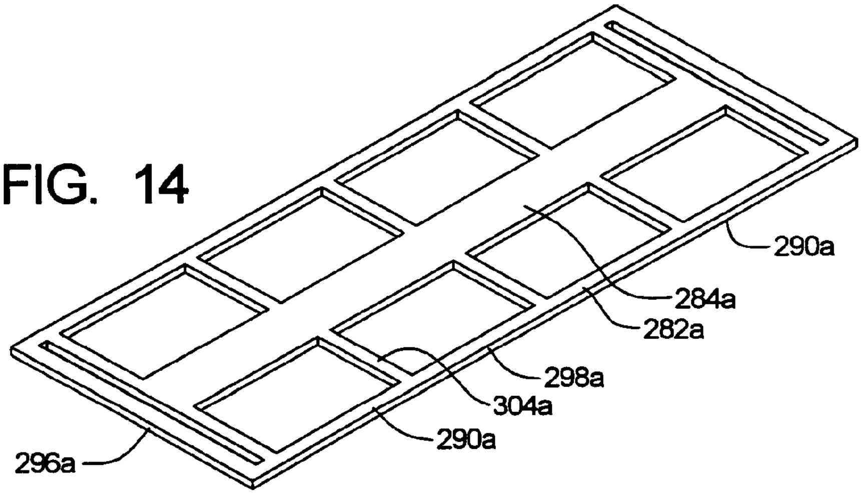
FIG. 14 is a second design of an interconnecting section of the second embodiment.

3) Various Arrangements of the Interconnecting Positioning and Force Transmitting Section FIGS. 13 and 14 show two different arrangements of the interconnecting frame portion 294. The version shown in FIG. 13 is the version which is shown in FIG. 9. In FIG. 13, three of the pairs 302 of connecting arms 304 have both connecting arms 304 in a moderate curved configuration so that three of these pairs of arms 304 are curved to be above a plane occupied by the interconnecting frame 282. The other two pairs 302 of connecting arms 304 curve in a downward curve that extends below the plane occupied by the interconnecting frame 282. Thus, as can be seen in FIG. 13, circled numerical designations are given to each pair 302 of arms 304, beginning with the numeral one at the lower left end of FIG. 13 and continuing on through to the upper right end, as seen in FIG. 13. Three of the pairs are identified by circled numerals 1, 3 and 5, and these have an upwardly curved configuration, while those two pairs of 302 of arms 304 at a location between pairs 1 and 3, and at a location between 3 and 5, respectively, designated by circled numerals 2 and 4 are in a downwardly curved configuration.

These arms 304 are resilient, so that when the magnet interconnecting frame portion 292 is deflected either upwardly or downwardly, these arms 304 function collectively as a balanced spring to maintain the alignment of the magnet section constant and to return the magnet interconnecting frame portion back toward its middle neutral location, as shown in FIG. 9. It will be noted that the spacing of the connecting arms 304 and also the alternating pattern of having the upwardly and downwardly curved arms 304 result in a symmetrical and balanced configuration, so that the interconnecting section 216 is able to reliably position the inertial section 214 so that its alignment orientation is substantially constant, and also so that its resisting force against upward and downward movement acts as a restoring force having a consistent pattern.

FIG. 14 shows an alternative configuration of the interconnecting frame section 282, and components of this alternative configuration will be given like numerical designations relative to the configuration of FIG. 13 with an "a" distinguishing those of this second arrangement.

In this second arrangement, the mounting structure connecting frame portion 290*a* is substantially the same as the mounting section connecting frame portion 290 of the first arrangement of FIG. 13, and also the magnet connecting frame portion 292 is the same as in FIG. 13. However, this alternative arrangement of FIG. 14 has the interconnecting frame portion 294*a* formed somewhat differently in that instead of having the curved arms 304 of the first arrangement of FIG. 13, the arms 304*a* of this alternative arrangement has each of the arms 304*a* in a straight line configuration, with these being in alignment with the plane occupied by the interconnecting frame 282*a*. However, the arrangement and spacing of these arms 304*a* and also the other components of this arrangement of FIG. 14 remain substantially the same so that the inertial section 214 is properly positioned not only in the neutral position, but also when it is moved upwardly and downwardly relative to the mounting structure 212.

It is believed that the mode of operation of this second embodiment is sufficiently clear from a review of the earlier text describing the operation of the first embodiment. Accordingly, the description of the operation of the second embodiment will not be included in this text.

Figure 16:
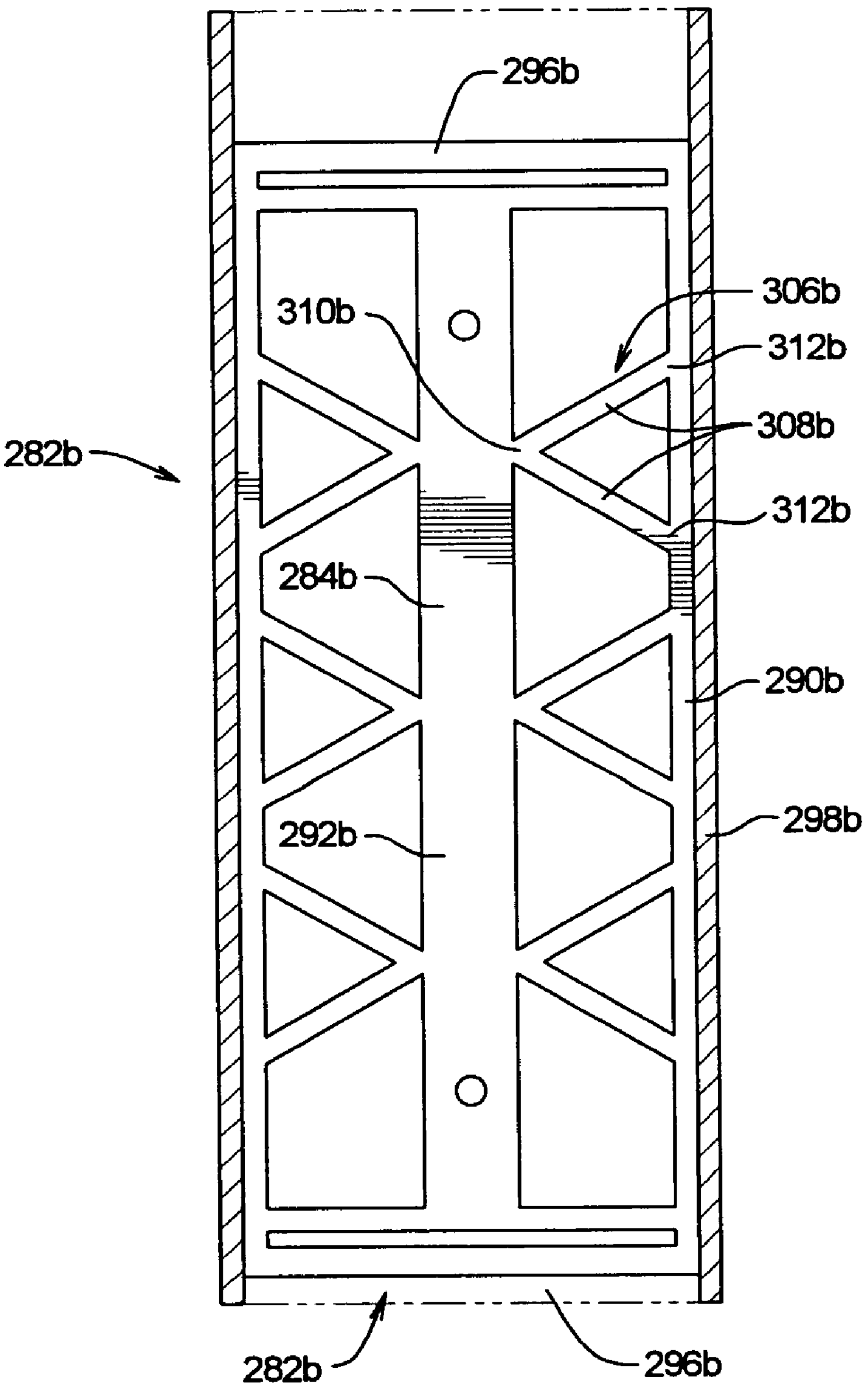
FIG. 16 is an plan view of yet another design of a positioning section which could be used in either of the first or second embodiments.

A third arrangement of the mounting structure connecting frame portion 290 of this second embodiment is shown in FIG. 16. This third arrangement of FIG. 16 which has components which are the same as, or similar to, components of the earlier two arrangements 290 and 290*a* will be given light numerical designations, with a "b" suffix distinguishing those of this third arrangement.

In this third arrangement of FIG. 16, the components which are similar to, or substantially the same as, components of the earlier two arrangements are the magnet interconnecting plate 284*b*, the interconnecting frame section 282*b*, the mounting structure connecting frame portion 290*b*, and the magnet connecting frame portion 292*b*.

This third arrangement 282*b* differs in that instead of using the laterally extending arms 384*a*, there is provided an arrangement where there is on each side of the center magnet connecting frame portion 292*b* three triangularly shaped bracing members 306*b*, each of which comprises two laterally extending and slanted arms 308*b*. Each pair of arms 308*b* meet at a center location adjacent to the magnet connecting frame portion 292*b*, and extend from that juncture location 310*b* laterally in a diverging pattern to connect at the connecting locations 312*b* at the mounting structure connecting frame portion 290*b*.

In this particular configuration, the two arms 308*b* of each bracing member 306*b* form a triangle which in this particular embodiment has a configuration of an equilateral triangle. Each of these arms 308*b* have a horizontal width dimension which is substantially greater than its depth dimension so that these can be resilient in an up and down motion, but would restrain any movement parallel to the longitudinal axis or the transverse axis.

The cross members and/or bracing members have a substantial transverse alignment component, and the overall alignment may vary somewhat from a totally transverse alignment.

4) Various Features and Aspects of the Design of the Embodiments

With the several embodiments and variations of the same now having been described, we will proceed to a discussion of various features and aspects of the embodiments of the present invention, with reference being made primarily to the first embodiment of FIGS. 2 through 8.

One significant aspect in the design of the tactile wave apparatus 10 relates to bandwidth, which can be characterized as resultant force versus frequency. It is desirable that the apparatus exhibit a more balanced ratio of peak force to average force. One reason for this is that music signals typically consist of multiple instruments all playing at once, producing notes at different frequencies. Also the tactile wave generated at a base frequency of, for example, forty to forty-five Hz, has overtones at higher frequencies. A poor ratio of peak to average level, (i.e., a high peak force but low energy at other frequencies) will accentuate a single instrument or the base frequency rather than provide a more balanced response to all of the instruments.

A key factor in what can be called a balanced transducer design is optimizing the driving force to the moving mass ratio. The bandwidth is proportional to the ratio of the driving force to the moving mass. Although reducing the magnitude of the moving mass will further increase bandwidth, the moving mass is also critical with respect to the resultant vibration force transmitted or "applied" to the listener.

To discuss briefly some of the physical principles involved, the resultant force applied to the listener defines the basic principle of operation. The transducer operates in accordance with Newton's 3.sup.rd law. Simply stated, "to every action there is always imposed an equal reaction". Or, $F=-F$ where F is an action force and $-F$ is the reaction force. This expression, $F=-F$ can also be stated in terms of Newton's 2nd law (in algebraic form, $F=ma$, where F is a force that produces an acceleration, "a" f the mass "m". The acceleration "a" is proportional to the applied force and the constant of proportionality is the mass, "m")

Newton's 3rd law can then be restated as $m_1a_1=-(M_2A_2)$. In the specific case of the transducer, $m_1$ is the mass of the permanent magnet structure assembly (the moving mass) and $a_1$ is the acceleration of the permanent magnet structure assembly. $M_2$ is the mass of the transducer chassis and the mass of the structure the transducer or shaker is attached to. (e.g., a chair or car seat, etc.). $A_2$ is the resultant acceleration of the shaker structure and attached mass. The product of the acceleration, $A_2$ and the moving mass, $M_2$ is the vibration or stimulus transmitted to the "listener".

As indicated above, the bandwidth is inversely proportional to the magnitude of the moving mass and directly proportional to the driving force. The relationship of the moving mass to both applied force (to the listener) and bandwidth requires an optimization of the mass. Too much mass will increase the force applied to the listener but at the expense of bandwidth. Too little mass will increase the bandwidth but at the expense of applied force. Thus, if the inertial mass is made smaller and the driving force remains the same, the bandwidth increases. Then if in addition to the making the inertial mass smaller, if the driving force is increased this would further enhance the performance of the apparatus relative to the bandwidth.

Another consideration is that the driver section 22 (comprising the coil section 24 and the magnet section 26) should be made to operate as efficiently as possible which would in turn mean that the amount of electric current generated would be as small as possible and yet be able to generate the desired level of force. As it turns out, optimizing the design to increase efficiency also relates to optimizing the bandwidth of the apparatus 10. The force generated by the drive section 22 is directly proportional to the flux density at the flux gap, and the flux density is greater if the width of the flux gap is made smaller.

Also, if the flux density is increased, for the coil to generate the same force on the inertial mass, then the electric current passing through the coil could be reduced by a corresponding amount to generate this same force level since the force is related to flux density times the magnitude of the current. Since the heat loss of an electric current is proportional to the square of the magnitude of the current, if the amount of the current is reduced by, for example, to one-half, the heat losses would be decreased by four times.

However, if the width of flux gap is to be made smaller, this necessitates that a number of design parameters should be considered. In this first embodiment, the coils 58 remain stationery, and the magnet section 26 moves upwardly and downwardly in the flux gaps 94. If the width of these flux gaps 94 are to be decreased, then the coil sections 64 and 66 would be that much closer to the side edge surfaces of the pole plates 72 and 74. In order to avoid the pole plates 72 and 74 from coming into contact with the coils 64 and 66 during this up and down movement of the magnet section 26 must be controlled to remain within rather close tolerances.

On the other hand, it was indicated above that if the length of the path of travel of the inertial mass at a given power input is to be made as large as is practical to obtain the desired bandwidth. This adds to the problem of how to keep the movement of the magnet section 26 within very close tolerances. If there is any wobbling or departure of the magnet section 26 from the vertical path of travel, this would require the wider flux gap.

Certain features of the design the embodiments of the invention are related to this consideration, and these will now be discussed relative to the first embodiment of FIGS. 2-8. In the apparatus 10 of this first embodiment, the two coils 58 are identical to one another and each coil 58 is symmetrical with respect to the longitudinal, transverse and vertical axes 28, 30 and 32. The substantially linear coils sections 64 and 66 of each coil 58 are parallel to one another and lie in the same vertically and longitudinally extending plane passing through the center of the coil. Further, the upper linear coil sections 66 of the two coils 58 lie in the same horizontal plane, and the lower linear coil sections 66 also lie in the same horizontal plane.

The upper and lower side surface portions 92 of the upper and lower pole plates 72 and 74 are all parallel with one another. The two side surface portions 92 on one side of the pole plate 72 lie in the same longitudinally and vertically aligned plane, and the two side surface portions 92 on the opposite side also lie in the same vertically and longitudinally aligned plane. The centerline of two upper side surface portions 92 lie in the same horizontal plane, as do the two lower side surface portions 92.

Thus, with this arrangement of the coils 58 and the side surface portions 92 the pole plates 72 and 74, when the identical amplified signals are passed through the two coils 58, the forces transmitted into the magnet section 26 are symmetrical and extend along substantially the total length of the side surface portions 92 of the pole plates 72 and 74 and also along the linear coil portions 64 and 66. Thus, the distribution of these forces along those lengths contributes to the stability of the magnet section 26 in moving within vary close tolerances along the vertical axis with very little deviation with regard to any rotational movement about any of three axes of the longitudinal, transverse and vertical axes.

As indicated previously, the interconnecting and positioning section 18 comprises upper and lower frames 104. Each frame 104 is symmetrical about both the longitudinal axis 106 and the transverse axis 107. Thus, the two longitudinally extending edge members 108 have the same physical configuration and are spaced equally from the longitudinal axis 106 of that frame 104. Each of these edge members 104 is connected to the housing 20 to limit any lateral movement, this being accomplished in that particular embodiment by the flange 114 and slot 116 connection.

The cross members 112 are constructed with a relatively greater width dimension than thickness dimension. Thus, these cross members 112 provide substantial resistance to any relative movement of the magnet connecting member 110 along the longitudinal axis 106. Yet the thickness dimension of the cross members 112 is small enough, so that (with the cross members 112 being a resilient material) the cross members 112 permit the up and down movement of the center section 110 within very close tolerances relative to any deviation from the vertical path of travel.

Thus, with the two frame members 104 being identical with one another, and with the cross members 112 being symmetrical, the movement of the magnet section 26 is restrained to be along the vertical axis, and rotational movement about any of the three axes 28, 30 and 32, is restrained. Thus, with symmetrical forces being applied both by the drive section 22 and the interconnecting and positioning section 18, and with the geometry of the magnet section 26 being symmetrical, the movement of the magnet section 26 in its up and down path is tightly constrained to be within quite close tolerances.

5) Relationships of Design Parameters of the Embodiments a) Introduction

With the foregoing being given as further background information, let us turn our attention now to yet more of the design parameters of the apparatus 10.

Figure 17:
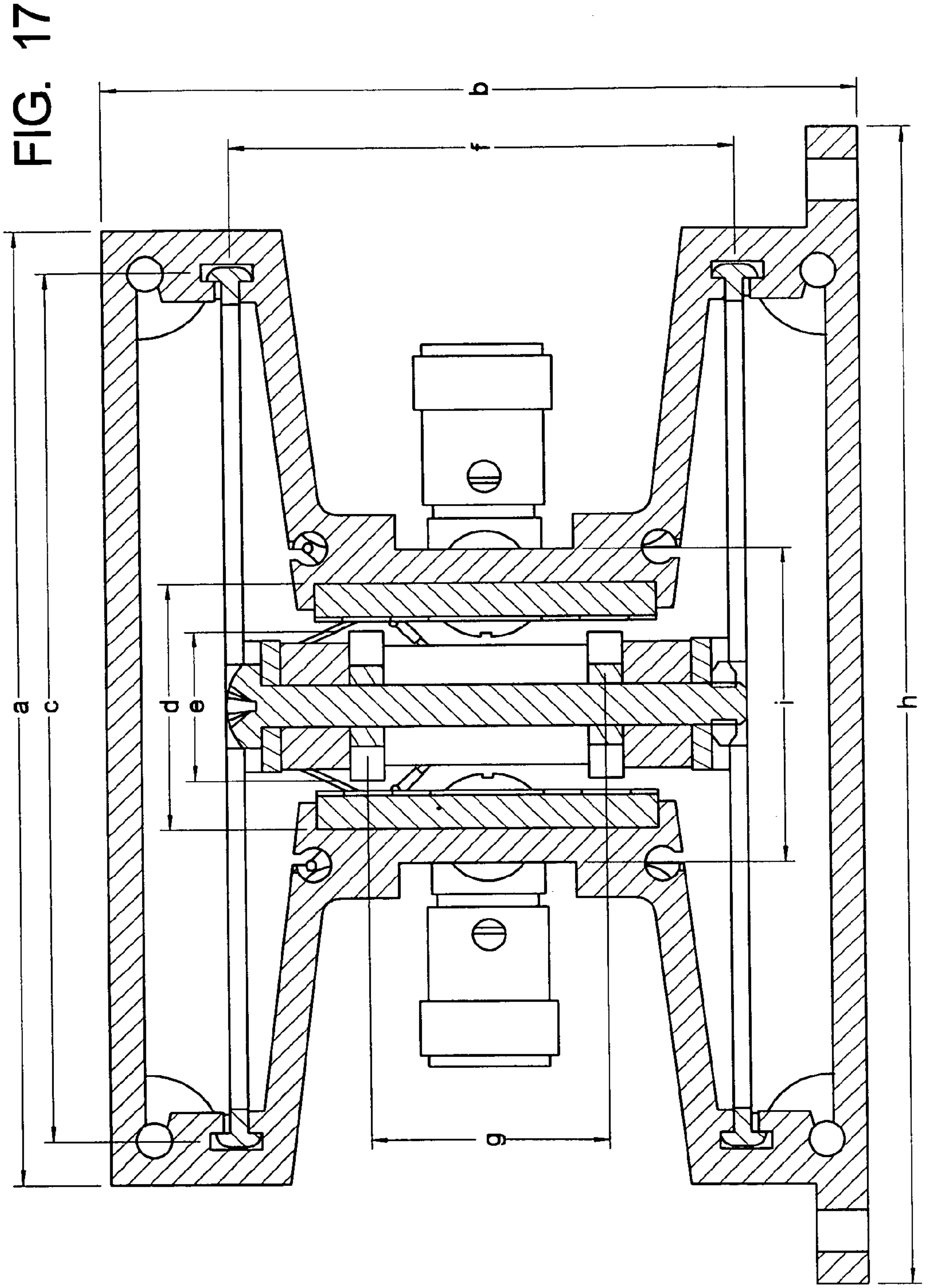
FIG. 17 is a sectional view which is substantially the same as FIG. 2, but with the numerical designations removed and certain dimensional relationships being illustrated, in accordance with the present invention.

In order to discuss further the design features of the embodiments of the present invention, reference will now be made to FIG. 17. It can readily be seen that FIG. 17 is identical to FIG. 2, which shows the first embodiment which is a later design of an embodiment of the invention. However, for purposes of leaving the drawing of FIG. 17 uncluttered for the discussion which is to follow, the numerical designations in FIG. 17 have been omitted.

In FIG. 17 there are indicated nine dimensions which are labeled "a" through to "i". These dimensions will be discussed one at a time in the following nine paragraphs, starting out with dimension "a", then dimension "b", etc. down to dimension "i". Since the magnet 70 is not shown in either FIG. 2 or 17, the length dimension of the magnet 70 has simply been given a letter designation "m".

In an actual apparatus that has been designed and constructed in accordance with FIGS. 2-8, the length dimension of the magnet 70 is four inches. This four inch dimension of the magnet 70 will be considered to be a reference dimension, and each of the dimensions "a" through "i" will be given a percentage value which is calculated in accordance with the four inch length dimension of the magnet 70. The magnet dimension is deemed to be 100%, and the other dimensions will be given a percentage value which is calculated in accordance with the four inch dimension of the magnet 70. Thus the dimension "f" which is 1.8 inches has a percentage value of 45%, since 1.8 is 45% of 4.0 length of the magnet which is at 100%.

There will now be in the following nine paragraphs a short presentation of each of these dimensions "a" through "i".

a) This dimension "a" is about 88.5%, and this is the total width dimension (i.e., transverse dimension) of the housing 20.

b) The dimension "b" is the vertical dimension of the housing 20, and this is at about 68% value.

c) The dimension "c" is the transverse dimension of each of interconnecting subsections which is distance between (connecting frames) 104, and is at about 82%.

d) The dimension "d" is the transverse dimension of the drive section 22, (i.e., width dimension) which is measured from the outside surfaces of the return plates 62. Thus this drive section 22 comprises the return plates 62, the coils 58, and the magnet section 26. The percentage value of this dimension "d" is about 23%.

e) The dimension "e" is the effective width dimension of the magnet section 26, which is deemed to be the distance between the outside edge surfaces of each of the pole plates of 72 and 74, since these are the outer location at which the electromagnetic forces are imposed on the magnet section 26. This dimension "e" is about 12.5%.

f) The dimension "f" is the vertical spacing distance of the upper and lower interconnecting subsections 104. This dimension is about 45%.

g) This dimension "g" is the effective vertical dimension of the magnet section 26 (i.e., the magnet 70 with the pole plates 72 and 74). This is measured from the vertical center locations of the pole plates 72 and 74, and the reason for this is that this would be the vertical center location where the forces between the pole plates 72 and 74 and the middle coil sections 64 and 66 are applied. This effective vertical dimension is at about 23%.

h) This dimension "h" is the transverse distance between the outer edge surface of the two base flanges 144 which are actually extension of the lower plate 42 of the mounting section 14, with these flanges 144 being the location of which the mounting section 14 is secured to the seat platform 34 or other structure. The percentage value is about 107%.

i) The dimension "i" is the transverse distance between the outer surfaces of the two plates of the middle portion of the housing 20. This has a percentage dimension of about 29%.

Finally, the magnet 70 has a length dimension "m" which does not appear on FIG. 17, and this length dimension is 100%.

Let us now examine some of these dimensional relationships regarding how they affect the function of the apparatus 10.

b) The Ratio of Dimension "c" to Dimension "e"

Dimension "c" is the transverse dimension of the interconnecting frames 104 and dimension "e" is the effective width of the magnet 70, which are, respectively, 82% and 12.5%. This makes the ratio of 82% to 12.5% which translates to about 6.5 to 1. The magnet 70 along with the pole plates 72 and 74, and also the tuning blocks 76 and 78 comprise a greater part of the inertial mass, and for the reasons indicated previously in this text, it is essential that this inertial mass move upwardly and downwardly within very close tolerances to the vertical path of travel of the magnet section 26, and also stay properly aligned and centered on that vertical path of travel. These are in turn connected to the upper and lower centrally located magnet connecting members 110 of the frames 104, and these are in turn attached to the cross members 112 that connect to the edge members 108.

As the inertial mass moves upwardly and downwardly, this will cause a moderate bending of the cross members 112. With this dimension "c" being made substantially greater than the width of the inertial mass, the up and down path of travel causes substantially no elongation along the length of these cross members 112, which in this instance is almost infinitesimal. At the same, these cross members 112 have sufficient strength to maintain the magnet section 26 in its neutral position, and also (being resilient cross members) would provide the upward and downward forces to bring the magnet section 26 back to its central position. Present analysis indicates that if this dimension "c" were made substantially smaller, the design changes that would need to be made to maintain a given length travel would result in the magnitude of the tolerances of the vertical path of travel of the magnet section 26 being increased, and its capability of moving vertically within very close to tolerances would be diminished.

As indicated earlier in this text, since this enables the mid-coil sections 64 and 66 and the edge surface portions of the pole plates 72 and 74 to be positioned within very close to one another, this would increase flux density across the flux gaps. Thus, with the present design, the amount of current which would be required to produce a given level of force from the magnet section would be kept to a lower level, thus improving efficiency and reducing unwanted heat being generated.

Obviously, these dimensions could be varied for a variety of reasons, and this of course could change these relationships.

As indicated above, this ratio of "c" to "e" is 6.5 to 1. To discuss the variations that could be made in this ratio, we will first establish a "ratio difference value" by subtracting the value 1 from 6.5 to give a ratio difference value of 5.5 which represents the amount that dimension "c" exceeds dimension "e". This value 5.5 could be decreased by increments of 0.5 toward an intermediate level of 4, which would reduce the ratio toward 5 to 1, or further in 0.5 increments toward a level of 2 to a value of 3 to 1. Or the value of 5.5 could be increased by 0.5 increments of 0.5 up to 7.0 which effectively would make the ratio 8 to 1 or toward a higher value of 11 for a 12 to 1 ratio.

If this ratio is made greater up to, for example 12 to 1, there would have to be either a substantial increase in the dimension "c" and/or a substantial decrease in the width of the magnet section. Present analysis indicates that for most practical situations, this ratio would not be increased or decreased to the limits given above. However, there may be some other design requirements that would dictate such departures even further from the 6.5 to 1 ratio.

c) The Ratio of Dimension "c" to Dimension "g"

This dimensional relationship is closely related to the dimensional relationship of the dimension "c" to the dimension "e", and this ratio of the dimension "c" which (as indicated above) is the transverse dimension of each of the frames 104 to the dimension "g" which is the vertical dimension of the magnet section 26.

With the percentage transverse dimension of the frame sections 104 (dimension "c") being 82%, and the vertical dimension "g" of the magnet section 26 having a percentage value of 23%, there is a ratio of 82% to 23%, which is about a 3.6 to 1 ratio. The relationship between the vertical dimension "g" of the magnet section 26 and the width dimension of the magnet section 26 is to a large extent dictated by the design requirements of the apparatus 10. It is desired to make the apparatus 10 as compact as possible, and the magnet section 26 should have its width and height dimensions selected so that the mass of the magnet section is at the proper magnitude. Further, the magnet section 26 should be designed and dimensioned so that it could function properly as part of the drive section in generating the desired force to move the inertial mass. Therefore, the above comments made with respect to the ratio of dimension "c" to "e" would also apply to the ratio of dimension "c" to "g", with "g" being the vertical dimension of the magnet section 26.

To discuss the possible changes in this ratio which is about 3.6 to 1, we shall also subtract the numeral 1 to obtain a ratio difference value which leaves 2.6 to 1. This 2.6 value could be decreased in increments of 0.2 first downwardly toward an intermediate level of 2, which would be a ratio of 3 to 1, or further downwardly 2 to 1 or possibly lower.

Or the value of 2.6 could be raised in increments of 0.2 toward an intermediate level of 4 to make a ratio of 5 to 1 or higher in increments of 0.2 toward a ratio of 7 to 1 or possibly higher.

As with the "c" to "e" ratio discussed immediately above, present analysis indicates that as the design would approach these more substantial increases or decreases to depart further from the more desired design parameters less desirable. However, there may be other design changes to make this practical.

d) The Ratio of Dimension "c" to Dimension "d"

Another ratio to be examined is that between the dimension "c" which is the transverse dimension of the frames 104 of the interconnecting section 18 and the dimension "d" which is the total width of the drive section measured to the outside surfaces of the return plate 62. This ratio is about 3.6 to 1. It should also be noted that the side plates 48 of the middle section 40 of the mounting section 14 are in close physical contact with the two return plates 62 which in turn are positioned to be in contact with the coils 58. Thus, the heat generated in the coils 58 have a heat sink into the soft steel return plates 62 to the side plates 48 of the housing 20, and also into the other adjacent portions of the mounting section 14.

Therefore, there is something of a "balancing act" in arriving at an optimized dimension "c", and also having the sidewalls 48 at the middle of the housing 20 positioned so as to be able to be in proper heat transfer with the coils 58. Beyond this, as indicated above, is part of the "big picture" the total mass and also the total mass of the inertial section 16 and its transverse and vertical dimensions must be kept within practical design limits.

This ratio of "c" to "d", could be increased and decreased generally in the same way that was explained above with reference to the ratio "c" to "g" and "c" to "e". Thus, this would make this the ratio as high 10 to 1, or as low as possibly 3 to 1 or as low as 2 to 1 by increments of 0.2 or 0.5. The comments made above with reference to the ratio "c" to "g" would in large part also apply to the ratio of "c" to "d", and this would bring us to increases up to about as high as possibly 10 to 1 or higher, or as low as possibly 2 to 1.

e) The Ratio of Dimension "c" to Dimension "m"

The percentage values of "c" and "m" are 82% and 100% respectively, with the 82% dimension being the transverse width dimension of the positioning frames 104 and the dimension "m" being 100% and the length of the magnet 70. This ratio of 82 to 100 translates to 0.82 to 1.

We shall first discuss the situation where distance "m" remains the same relative to the other numerical design parameters given by the letters "a" through "i" (except for the dimension "c" for the transverse dimension of the frames 104). In this instance if the value of "c" is increased substantially, there would likely be an application of the law diminishing returns in that there would probably not be much benefit in doing so. However, there be some design changes or considerations which would make it otherwise.

On the other hand if this dimension "c" is substantially reduced, then the capability of the frames 104 may be somewhat diminished. Nevertheless, to allow for these situations, depending upon what other design changes are being made, the ratio of 0.82 to 1 could be increased or decreased in increments of 0.4 up toward as high as 1.5 to 1 t higher toward 2 to 1, or diminished by increments of 0.4 toward a level of 0.6 to 1, or possibly as low as 0.4 to 1 or possibly lower.

With regard to this ratio being changed by either increasing or decreasing the length of the magnet (i.e., dimension "m"), the various considerations relating to changing this dimension of the length of the magnet section 26 is discussed in more detail in section g which follows. The considerations discussed in that section would apply in large part to this present section e, so it will not be repeated at this point.

f) The Ratio of Dimension "c" to Dimension "f"

The ratio of "c" to "f" is 82 to 45 which turns out to be approximately 1.8 to 1. As indicated several times above, the dimension "c" having an 82% value is the transverse width of the frames 104 of the interconnecting section. The dimension "f" is the vertical spacing distance between these two frames 104, and it has a value of 45%. Thus, the 82% to 45% translates into a ratio of about 1.8 to 1.

We will assume that the value 1.8 of this ratio can be increased or decreased by increments of 0.2, so that it could increase, for example, to 2.0, 2.2, etc. If the dimension "c" is to remain constant along with the other dimensions "a" through "i", and the dimension "f" (which is the vertical spacing of the frames 104) were to be increased, this could reasonably be done to some extent for some design requirements, without detracting significantly to its value in properly centering the magnet section in its up and down travel. On the other hand, if this dimension is made smaller, this would permit the vertical dimension of the housing to be reduced, thus making the apparatus more compact.

While the analysis of the present design would indicate there may not be much value in making a significant amount of modification of this ratio, within the broader scope, it would be possible to increase the value of 1.8 by increments of 0.2 toward, for example, 2 to 1 or 3 to 1 or higher, or to decrease it by 0.2 increments down toward 1.2 to 1 or 0.8 to 1.

g) The Ratio of the Dimension "m" to the Dimension "e"

This is the ratio of the length of the magnet (dimension "m") to the transverse width dimension of the magnet section (dimension "e"). These percentage values are 100% to 12.5% so that the ratio between these is 8 to 1. This ratio could be changed by increasing the length of the magnet (i.e., dimension "m") so that this ratio could be at least a 10 to 1, 15 to 1, or at least in theory as high 20, 30 or 40 to 1 or higher), if that were the done, then the other components would have to be increased in length dimension by a comparable amount. There may be some design applications where this may be a desired, such as increasing the inertial mass by increasing length "m" while keeping the same cross section of the magnet section 76. Thus, to accommodate the different design options, is it assumed that this ratio could be increased substantially.

On the other hand decreasing this ratio while the dimension "e" remains the same this would shorten the length of the magnet 70. However, any significant shortening of the length of the magnet 70 would reduce the force to move the magnet and its associated mass up and down, but there would be a corresponding reduction in the amount of the inertial mass assuming a constant cross section. However, this may reduce the ability of the magnet to be more stable with regarding to maintaining its orientation during the up and down movement.

As discussed earlier in this text, by distributing the force over a greater length dimension of the longitudinal axis, this enhances stability so that there can be closer tolerances in the flux gaps 94. Nevertheless, for various design reasons, it may be that the value 8 of the ratio of 8 to 1 be reduced to reduce the length of the magnet by increments of, for example, 1.0, we would arrive at a lower limit of 6 to 1, 4 to 1, 3 to 1 or possibly 2 to 1. However, present analysis indicates that not only would the mass be substantially reduced, but there would likely be greater difficulty in maintaining the up and down movement of the magnet within the sufficiently close tolerances.

h) The Ratio of the Dimension "a" to Dimension "b"

This is the relationship of the transverse width of the housing (dimension "a") and the vertical dimension "b" of the housing 20. The dimension "a' is at about 88.5% and the dimension "b" is about 68%. The ratio of 88.5 to 68 translates to about 1.3 to 1.

These two dimensions are dictated to a large extent by the transverse dimension of the frames 104, and the vertical dimension "e" of the magnet section 26, plus the added vertical dimensions that may occur due to the use of the tuning blocks 76 and 78. Nevertheless, since there may be different requirements due to modifications in the design, quite possibly the 1.3 value of this ratio could be modified by 0.1% increments up to a level of 1.8 to 1 or possibly 2 to 1 or 3 to 1, or reduced to a ratio of 1 to 1, or 0.8 to 1 or 0.6 to 1.

i) The Ratio of the Dimension "a" to the Dimension

The outside dimension of total width dimension "a" (i.e., transverse dimension) of the housing 20 is 88.5%, and the percentage transverse width dimension "i" between the outside surface of the middle portion of the housing 20 is 29%, so that there is a ratio of 88.5% to 29% which translates to a 3 to 1 ratio.

As indicated earlier in this text, each of the two return path plates 62 are positioned in contact with the coil section 58 and also with the middle housing plates 40 so that there is a heat sink from the coil 58 into the return path plate 62 and to the plates 40 of the housing 20. Accordingly, this dimension "i" is dictated primarily by the width dimension of the drive section 22 of the apparatus 10 and thus will be a small amount greater dimension "d". Thus, the dimension variations of the dimension "i" would be about one quarter greater than those of the dimension "d" of the drive section. The ratio of 3 to 1 could be lowered to 2.5 to 1 or 1.5 to 1, or increased possibly to 4 to 1 or 5 to 1.

It is evident that various modifications could be made to the present invention without departing from the basic teachings thereof, and that the descriptive text of these embodiments is not intended to define the scope of the present invention, since that is contained in the claims. Therefore, when the text of this patent application discloses particular components and configurations and arrangements of these components, this description is not intended to limit corresponding recitations of these components in the claims to that particular configuration or component.

Also, the various relationships of the design parameters of the embodiments as disclosed in the previous text are characteristic of the apparatus being designed for one application, and yet could be used in a variety of applications. Nevertheless, the design requirements may be rather different for different applications, such as operating in different environments, the need to have different frequency or frequencies and/or strength of the tactile waves being generated, dimensional requirements due to the configuration or characteristics of the structure or other device with which it is to be associated, etc.

Thus, while some of these relationships may be applicable to these somewhat modified designs, it could be that others are not. Therefore, providing this information of these various design parameter is not necessarily to limit the scope of the claims in covering apparatus which may be totally outside of some of those relationships, and the scope of the claims is not intended to be limited to incorporating any or all of these design requirements, without departing from the basic teachings of the present invention.

Having described preferred embodiments of a new and improved apparatus and method, it is believed that other modifications, variations and changes will be suggested to those skilled in the art in view of the teachings set forth herein. It is therefore to be understood that all such variations, modifications and changes are believed to fall within the scope of the present invention as set forth in the following claims.

We claim:

1. An apparatus adapted to transmit low frequency tactile waves into a structure and/or to a person's body, said apparatus comprising:

a) a mounting section comprising at least a housing defining a chamber, said housing having a longitudinal axis, a transverse axis and a vertical axis;

b) an inertial section comprising at least a generally longitudinally aligned magnet section mounted in said chamber for movement upwardly and downwardly from a neutral location, said magnet section having upper and lower pole portions, with each pole portion comprising oppositely positioned, generally longitudinally aligned pole side surface portions;

c) a coil section comprising two laterally spaced coils mounted to said housing and located in said chamber on opposite sides of said magnet section, each coil having upper and lower generally longitudinally aligned coil portions and first and second end connecting coil portions connected between first and second end portions, respectively, of the generally longitudinally aligned coil portions, each generally longitudinally aligned coil portion being located next to a related one of said pole side surface portions when the magnet section is at its neutral position;

d) said coil section further comprising two generally vertically aligned return path members which are located on opposite sides of the magnet section, each return path member being adjacent to, and extending between, the upper and lower generally longitudinally aligned coil portions of an adjacent one of the coils to form a flux path between the upper and lower generally longitudinally extending coil portions;

e) an interconnecting section comprising upper and lower interconnecting subsections, each of said interconnecting subsections comprising two oppositely located longitudinally extending housing connecting portions, a central longitudinally aligned connecting portion, and two interconnecting portions connecting to and extending between the central connecting portion and the housing connecting portions, said apparatus being arranged so that with the magnet section in its neutral position, the two housing connecting portions and the central connecting portion are located in substantially the same horizontal plane, said interconnecting section being constructed and arranged to permit vertical up and down movement of said magnet section as part of the inertial section and to restrict rotational movement of said magnet section about any of said longitudinal, transverse and vertical axes and restrict movement of said magnet section in a direction having either or both of a transverse or a longitudinal alignment component so as to restrict movement of said magnet section to vertically aligned up and down movement, said interconnecting section being resiliently connected to said inertial section to locate said magnet section in the neutral position and to resiliently urge said magnet section toward the neutral position;

whereby, when the coils are simultaneously energized, substantially uniform and equal electromagnetic forces are created along the length of the magnet section on opposite sides thereof to cause up and down cyclical movement of the magnet section as at least part of the inertial section, with the upper and lower interconnecting subsections applying resilient forces to move the magnet section back toward its neutral position while maintaining consistent orientation of the magnet section and minimizing any deviation from vertically aligned up and down movement.

2. The apparatus as recited in claim 1, wherein the interconnecting subsections have a transverse dimension "c" which is the distance between the two housing connecting portions, and this dimension "c" of the interconnecting sections has a proportional relationship with one or more of the following:

i. a proportional relationship with the effective width dimension "e" of the magnet section, with the ratio of "c" to "e" being at least about 3 to 1;

ii. a proportional relationship with the effective vertical dimension "g" of the magnet section, with the ratio of "c" to "g" being at least about 2 to 1;

iii. a proportional relationship with the transverse dimension of the drive section which is measured from the outside surfaces of the return plates 62, with this ratio of "c" to "d" being at least 2 to 1;

iv. a proportional relationship with the vertical spacing dimension "f", which is distance between the upper and lower interconnecting subsections, with this ratio being no less than about 0.8 to 1.

3. The apparatus of claim 2, wherein the ratio of "c" to "e" is at least about 5 to 1, the ratio of "c" to "g" is at least about 3 to 1, the ratio "c" to "d" is at least about 3 to 1, and ratio "c" to "f" is no less than about 1.2 to 1.

4. The apparatus as recited in claim 1, wherein the magnet section has a length dimension "m", and this dimension "m" has a proportional relationship to the effective width dimension "e" of the magnet section with the ratio of "m" to "e" being no less than about 3 to 1.

5. The apparatus as recited in claim 4, wherein the dimensional relationship of "m" to "e" is a ratio of no less than about 6 to 1.

6. The apparatus as recited in claim 1, wherein the housing has upper and lower housing portions and a middle housing portion, and the upper and lower portions of the housing have a width dimension "a", and a transverse distance between outer surfaces of the middle portion of the housing has a dimension "i", and the ratio of the dimension "a" to the dimension "i" is no greater than about 5 to 1, and no less than about 1.5 to 1.

7. The apparatus as recited in claim 6, wherein the return path members are in sufficiently close contact to the coils and to side walls of the middle housing portion so as to be in heat exchange relationship with the coils and the side walls of the middle housing section to provide a heat sink for the coils.

* * * * *